(12) United States Patent
Uziel et al.

(10) Patent No.: US 12,058,077 B2
(45) Date of Patent: Aug. 6, 2024

(54) NOTIFICATION OF PUNCTURING A PHYSICAL DOWNLINK SHARED CHANNEL

(71) Applicant: QUALCOMM Incorporated, San Diego, CA (US)

(72) Inventors: Lior Uziel, Hod Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/583,501

(22) Filed: Jan. 25, 2022

(65) Prior Publication Data
US 2023/0239120 A1    Jul. 27, 2023

(51) Int. Cl.
*H04L 5/00*    (2006.01)
*H04L 1/00*    (2006.01)
*H04W 72/23*    (2023.01)

(52) U.S. Cl.
CPC .......... *H04L 5/0064* (2013.01); *H04L 1/0013* (2013.01); *H04L 5/0048* (2013.01); *H04L 5/0053* (2013.01); *H04L 5/0094* (2013.01); *H04W 72/23* (2023.01)

(58) Field of Classification Search
CPC ... H04L 5/0064; H04L 1/0013; H04L 5/0048; H04L 5/0053; H04L 5/0094; H04W 72/23
See application file for complete search history.

(56) References Cited

U.S. PATENT DOCUMENTS 10,499,416 B2 *  12/2019  Lee ................. H04L 5/0048
2019/0313380 A1 * 10/2019  Ye .................. H04L 1/188

* cited by examiner

*Primary Examiner* — Chandrahas B Patel
(74) *Attorney, Agent, or Firm* — Holland & Hart LLP

(57) ABSTRACT

Methods, systems, and devices for notifying puncturing of a physical downlink shared channel (PDSCH) are described. In some examples, a user equipment (UE) may receive, from a base station, a first control message identifying a set of resources used for transmissions by the base station. The UE may receive a second control message that includes an indication of a procedure used by the base station for a collision between the set of resources and a downlink channel transmitted to the first UE by the base station. In some examples, the UE may receive and decode signals on the downlink channel according to the indicated procedure.

22 Claims, 18 Drawing Sheets

NOTIFICATION OF PUNCTURING A PHYSICAL DOWNLINK SHARED CHANNEL

FIELD OF TECHNOLOGY

The following relates to wireless communications, including notification of puncturing a physical downlink shared channel (PDSCH).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may transmit a data transmission using specific resource elements (REs), even though one or more other channels and signals may be transmitted on those specific REs. In other words, the base station may refrain from rate matching the data transmission with specific signals and channels. Such signals and channels may therefore be transmitted on REs occupying the data transmission symbols, causing collisions between signals.

SUMMARY

The described techniques relate to improved methods, systems, devices, and apparatuses that support notification of puncturing a physical downlink shared channel (PDSCH). Generally, the described techniques provide for indicating PDSCH collisions such that a base station may notify a user equipment (UE) of a collision as well as a type of transmission associated with the collision (e.g., spatial separation or puncturing). For example, the base station may transmit control information to the UE notifying the UE of channels and reference associated with different beams, cells, among other sectors. In such examples, the base station may determine to transmit a data transmission to the UE, for example, using resource elements (REs) overlapping with the other channels and signals. In some examples, the base station may evaluate whether it may be able to spatially separate the non-rate matched channels and signals and the data transmission. In examples where the base station completes the evaluation in time for the transmission of the colliding data transmission and the other channels and signals, the base station may transmit the control information including information notifying UEs of the use of spatial separation. As such, the base station may indicate the use of spatial separation in the control information and may refrain from rate matching the data transmission with the other channels and signals. In some examples, the base station may determine to transmit the data transmission and the other channels and signals without using spatial separation. As such, the base station may indicate transmission without spatial separation in the control information and may rate match the data transmission with the other channels and signals. The UE may identify the rate matching indication and may receive the data transmission in accordance with the rate matching around the other channels and signals.

In examples where the base station fails to complete the evaluation in time for the transmission of the colliding data transmission and other channels and signals, the base station may transmit the data transmission without rate matching. For example, the base station may fail to complete the evaluation in time and as such, the base station may refrain from rate matching around aperiodic channel state information reference signals (A-CSI-RSs), channel state information reference signals (CSI-RSs) for mobility, a combination thereof, or signals referenced to other cells or beams not associated with the UE (e.g., as compatible with defined configurations at the UE). In examples where the base station has insufficient information to complete the evaluation (e.g., when one or more other signals are transmitted from another base station with no additional information), the base station may transmit the data transmission without rate matching. Additionally, the base station may transmit the control information including information notifying UEs of the use of puncturing (e.g., notifying UEs to drop PDSCH symbols allocated to REs associated with the other channels and signals). In some examples, the base station may determine to transmit the data transmission and the other channels and signals using spatial separation. As such, the base station may indicate the use of spatial separation, without puncturing, in the control information. In some examples, the base station may determine to transmit the data transmission and the other channels and signals using puncturing. As such, the base station may indicate that the data transmission was punctured by another channel or signal. For example, the base station may indicate that one or more PDSCH symbols associated with a first set of channels and signals may be overridden by a second set of channels and signals.

A method for wireless communication at a first user equipment (UE) is described. The method may include receiving, from a base station, a first control message identifying a set of resources used for transmissions by the base station, receiving a second control message that includes an indication of a procedure used by the base station for a collision between the set of resources and a downlink channel transmitted to the first UE by the base station, and receiving and decoding signals on the downlink channel according to the indicated procedure.

An apparatus for wireless communication at a first UE is described. The apparatus may include a processor, memory coupled with the processor, and instructions stored in the memory. The instructions may be executable by the processor to cause the apparatus to receive, from a base station, a first control message identifying a set of resources used for transmissions by the base station, receive a second control message that includes an indication of a procedure used by the base station for a collision between the set of resources and a downlink channel transmitted to the first UE by the base station, and receive and decode signals on the downlink channel according to the indicated procedure.

Another apparatus for wireless communication at a first UE is described. The apparatus may include means for receiving, from a base station, a first control message identifying a set of resources used for transmissions by the base station, means for receiving a second control message that includes an indication of a procedure used by the base station for a collision between the set of resources and a downlink channel transmitted to the first UE by the base station, and means for receiving and decoding signals on the downlink channel according to the indicated procedure.

A non-transitory computer-readable medium storing code for wireless communication at a first UE is described. The code may include instructions executable by a processor to receive, from a base station, a first control message identifying a set of resources used for transmissions by the base station, receive a second control message that includes an indication of a procedure used by the base station for a collision between the set of resources and a downlink channel transmitted to the first UE by the base station, and receive and decode signals on the downlink channel according to the indicated procedure.

In some examples of the method, apparatuses, and non-transitory computer-readable medium described herein, receiving the second control message may include operations, features, means, or instructions for receiving, in the second control message, both the indication and scheduling for signals on the downlink channel.

In some examples of the method, apparatuses, and non-transitory computer-readable medium described herein, receiving and decoding the signals on the downlink channel according to the indication may include operations, features, means, or instructions for receiving signals on at least a portion of the downlink channel that overlaps with at least a portion of the set of resources based on the indicated procedure being that the base station may have spatially separated signals on the set of resources from signal of the downlink channel and decoding the received signals.

In some examples of the method, apparatuses, and non-transitory computer-readable medium described herein, receiving and decoding the signals on the downlink channel according to the indication may include operations, features, means, or instructions for performing rate matching around the set of resources to receive the signals based on the indicated procedure being that the base station may have rate matched the set of resources around signals of the downlink channel and decoding the received signals.

In some examples of the method, apparatuses, and non-transitory computer-readable medium described herein, the second control message may be a second downlink control information (DCI) message and the method, apparatuses, and non-transitory computer-readable medium may include further operations, features, means, or instructions for receiving a first DCI message that includes scheduling information for the signals on the downlink channel, where receiving and decoding the signals on the downlink channel according to the indication includes, receiving the signals on the downlink channel according to the scheduling information, the second DCI message received after receiving the signals, and decoding the received signals according to the indication received in the second DCI message.

In some examples of the method, apparatuses, and non-transitory computer-readable medium described herein, the indicated procedure being that the base station may have spatially separated signals on the set of resources from signals of the downlink channel, and decoding the received signals may include operations, features, means, or instructions for decoding the received signals of the downlink channel to remove interference from the signals on the set of resources.

In some examples of the method, apparatuses, and non-transitory computer-readable medium described herein, the indicated procedure may be that the base station may have punctured signals the downlink channel with signals on the set of resources, and decoding the received signals may include operations, features, means, or instructions for identifying one or more log likelihood ratio (LLR) values associated with the signals on the set of resources and decoding the received signals of the downlink channel exclusive of the one or more LLR values.

Some examples of the method, apparatuses, and non-transitory computer-readable medium described herein may further include operations, features, means, or instructions for transmitting, to the base station, a capability indication identifying that the first UE may be capable of receiving the indication of the procedure used by the base station for the collision between the set of resources and the downlink channel.

In some examples of the method, apparatuses, and non-transitory computer-readable medium described herein, the set of resources include resources for synchronization signal blocks (SSBs), control resource sets (CORESETs), channel state information reference signals (CSI-RSs), physical broadcast channel (PBCH), system information blocks (SIBs), control channels, or any combination thereof, used by the base station to transmit to at least one second UE.

In some examples of the method, apparatuses, and non-transitory computer-readable medium described herein, the downlink channel may be associated with a first transmit beam and a first cell, and the set of resources used by the base station to transmit to at least one second UE may be associated with a different transmit beam, a different cell, or both.

A method for wireless communication at a base station is described. The method may include transmitting, to a first UE, a first control message identifying a set of resources used for transmissions by the base station, transmitting a second control message that includes an indication of a procedure used by the base station for a collision between the set of resources and a downlink channel transmitted to the first UE, and transmitting signals on the downlink channel according to the indicated procedure.

An apparatus for wireless communication at a base station is described. The apparatus may include a processor, memory coupled with the processor, and instructions stored in the memory. The instructions may be executable by the processor to cause the apparatus to transmit, to a first UE, a first control message identifying a set of resources used for transmissions by the base station, transmit a second control message that includes an indication of a procedure used by the base station for a collision between the set of resources and a downlink channel transmitted to the first UE, and transmit signals on the downlink channel according to the indicated procedure.

Another apparatus for wireless communication at a base station is described. The apparatus may include means for transmitting, to a first UE, a first control message identifying a set of resources used for transmissions by the base station, means for transmitting a second control message that includes an indication of a procedure used by the base station for a collision between the set of resources and a downlink channel transmitted to the first UE, and means for transmitting signals on the downlink channel according to the indicated procedure.

A non-transitory computer-readable medium storing code for wireless communication at a base station is described. The code may include instructions executable by a processor to transmit, to a first UE, a first control message identifying a set of resources used for transmissions by the base station, transmit a second control message that includes an indication of a procedure used by the base station for a collision between the set of resources and a downlink channel transmitted to the first UE, and transmit signals on the downlink channel according to the indicated procedure.

In some examples of the method, apparatuses, and non-transitory computer-readable medium described herein, transmitting the second control message may include operations, features, means, or instructions for transmitting, in the second control message, both the indication and scheduling information for signals on the downlink channel.

In some examples of the method, apparatuses, and non-transitory computer-readable medium described herein, transmitting the signals on the downlink channel according to the indication may include operations, features, means, or instructions for transmitting signals on at least a portion of the downlink channel that overlaps with at least a portion of the set of resources based on the indicated procedure being that the base station may have spatially separated signals on the set of resources from signal of the downlink channel.

In some examples of the method, apparatuses, and non-transitory computer-readable medium described herein, transmitting the signals on the downlink channel according to the indication may include operations, features, means, or instructions for performing rate matching around the set of resources to transmit the signals based on the indicated procedure being that the base station may have rate matched the set of resources around signals of the downlink channel.

In some examples of the method, apparatuses, and non-transitory computer-readable medium described herein, the second control message may be a second DCI message and the method, apparatuses, and non-transitory computer-readable medium may include further operations, features, means, or instructions for transmitting a first DCI message that includes scheduling information for the signals on the downlink channel, where transmitting the signals on the downlink channel according to the indication includes and transmitting the signals on the downlink channel according to the scheduling information, the second DCI message transmitting after transmitting the signals.

In some examples of the method, apparatuses, and non-transitory computer-readable medium described herein, the indicated procedure may be that the base station may have spatially separated signals on the set of resources from signals of the downlink channel.

In some examples of the method, apparatuses, and non-transitory computer-readable medium described herein, the indicated procedure may be that the base station may have punctured signals the downlink channel with signals on the set of resources.

Some examples of the method, apparatuses, and non-transitory computer-readable medium described herein may further include operations, features, means, or instructions for receiving, from the first UE, a capability indication identifying that the first UE may be capable of receiving the indication of the procedure used by the base station for the collision between the set of resources and the downlink channel.

In some examples of the method, apparatuses, and non-transitory computer-readable medium described herein, the set of resources include resources for SSBs, CORESETs, CSI-RSs, PBCH, SIBs, control channels, or any combination thereof, used by the base station to transmit to at least one second UE.

In some examples of the method, apparatuses, and non-transitory computer-readable medium described herein, the downlink channel may be associated with a first transmit beam and a first cell, and the set of resources used by the base station to transmit to at least one second UE may be associated with a different transmit beam, a different cell, or both.

DETAILED DESCRIPTION

Figure 1:
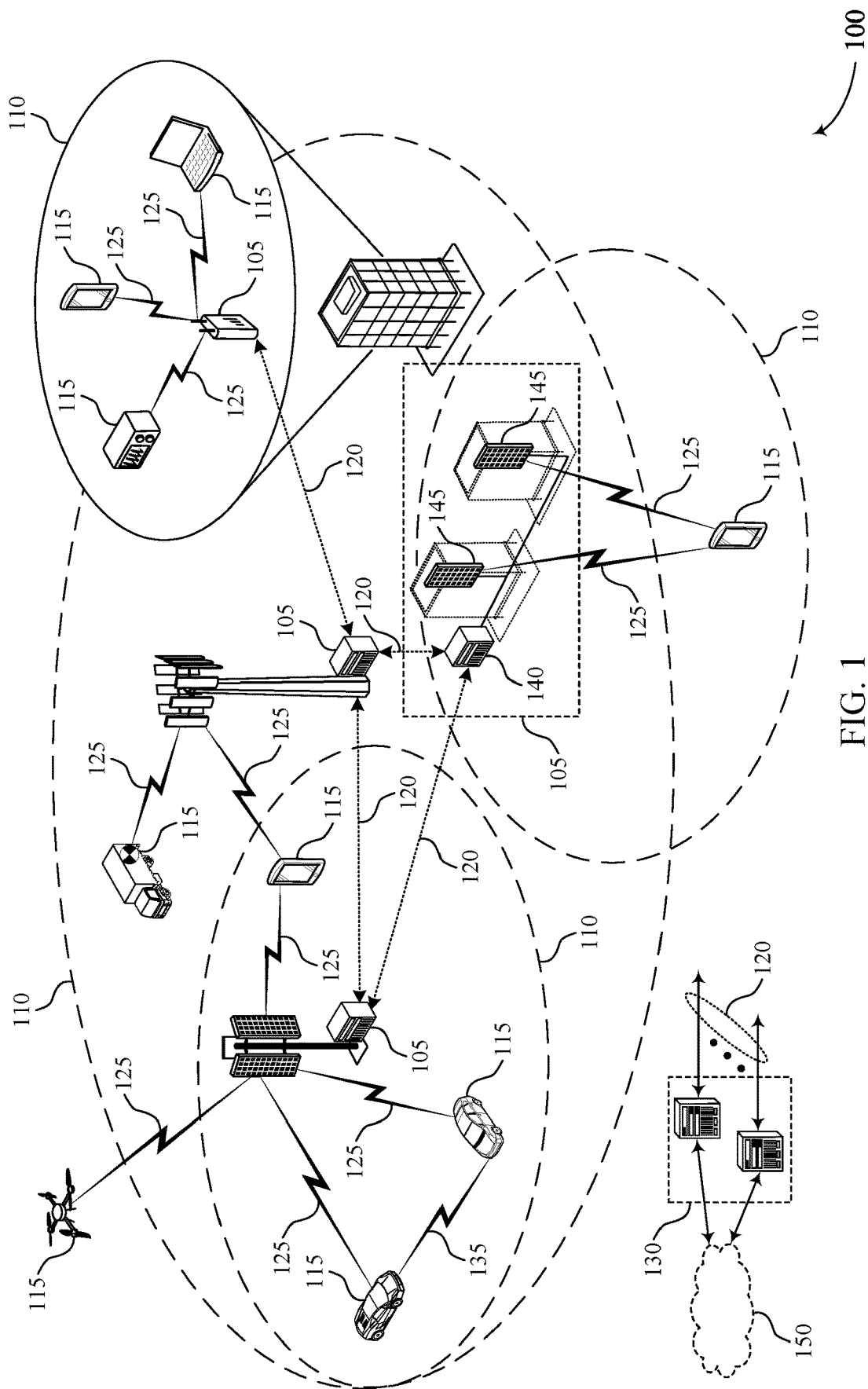
FIGS. 1 and 2 illustrate examples of wireless communications systems that support notifications of puncturing a physical downlink shared channel (PDSCH) in accordance with aspects of the present disclosure.

In some cases, a base station may transmit a data transmission to a user equipment (UE) in accordance with a physical downlink shared channel (PDSCH) transmission flow. For example, after scrambling and modulating data transmission, the base station may map the data transmission to one or more layers (e.g., logical layers, protocol layers) and one or more antenna ports. Additionally, the base station may map the data transmission to one or more virtual resource blocks (VRBs) (e.g., logical resource blocks). For example, the base station may map modulated PDSCH symbols to the resource elements (REs) of a VRB. In some cases, the base station may map the data transmission to specific REs, even though one or more other channels and signals may be transmitted on those specific REs. For example, the base station may transmit data transmission on the same REs that the base station transmits specific channels such as synchronization signal blocks (SSBs) of non-serving cells (e.g., base stations the UE may not be connected to), physical downlink control channel (PDCCH) messages not scheduling the data transmission, among other channels. In another example, the base station 105-a may transmit data transmission 210 on the same REs that the base station 105-*a* transmits specific signals such as aperiodic channel state information reference signals (A-CSI-RSs), CSI-RS for mobility, CSI for interference management (CSI-IM), positioning reference signals (PRSs), Long Term Evolution (LTE) signals, CSI-RS quasi co-located (QCLed) to an SSB of a different sector (e.g., where CSI-RS resources may be configured per UE), among other signals. In other words, the base station may refrain from rate matching the data transmission with specific signals and channels. Such signals and channels may therefore be transmitted on REs occupying the data transmission symbols, causing collisions between signals.

In scenarios where other signals and channels interfere with the data transmission, the base station may transmit the data transmission and overlapping channels and signals according to one or more possible behaviors. In some examples, the base station may transmit the data transmission and overlapping channels and signals, for example, transmitting data transmission to the UE using a first spatial layer and one or more CSI-RSs to another UE using a second spatial layer on REs overlapping with the data transmission. Transmitting data transmission and overlapping channels and signals may be referred to equivalently as "spatial separation." In some examples, the base station may not be able to transmit data transmission and overlapping channels and signals, and thus, may drop PDSCH symbols mapped to the overlapping resources. Transmitting data transmission and overlapping channels and signals and dropping the PDSCH symbols mapped to the overlapping resources may be equivalently referred to as "puncturing."

However, in some cases, the UE may lack the knowledge to optimize, or otherwise improve signal reception under collision conditions. In some cases, the UE may not be aware of a collision between the data transmission and other channels and signals. Additionally, even if the UE is aware of the collision between the data transmission and the other channels and signals, the UE may lack information about whether the base station transmitted the data transmission and the other channels and signals using spatial separation or using puncturing. Lacking knowledge of such collisions and lacking knowledge about whether the base station transmits the data transmission and other channels and signals using spatial separation or puncturing may result in diminished performance.

Some wireless communications systems may support collision type notifications such that a base station may notify a UE of a collision as well as a type of transmission associated with the collision (e.g., spatial separation or puncturing). For example, the base station may transmit control information to the UE notifying the UE of channels and reference signals (e.g., SSBs, control resource sets (CORESETs), CSI-RS) associated with different beams, cells, among other sectors. In such examples, the base station may determine to transmit a data transmission to the UE, for example, using REs overlapping with the other channels and signals (e.g., known to the UE). In some examples, the base station may evaluate whether it may be able to spatially separate the non-rate matched channels and signals and the data transmission. In examples where the base station completes the evaluation in time for the transmission of the colliding data transmission and the other channels and signals, the base station may transmit the control information including information notifying UEs of the use of spatial separation. In some examples, the base station may determine to transmit the data transmission and the other channels and signals using spatial separation. As such, the base station may indicate the use of spatial separation in the control information and may refrain from rate matching the data transmission with the other channels and signals. In some examples, the base station may determine to transmit the data transmission and the other channels and signals without using spatial separation. As such, the base station may indicate transmission without spatial separation in the control information and may rate match the data transmission with the other channels and signals. The UE may identify the rate matching indication and may receive the data transmission in accordance with the rate matching around the other channels and signals.

In examples where the base station fails to complete the evaluation in time for the transmission of the colliding data transmission and other channels and signals, the base station may transmit the data transmission without rate matching, for example, the base station may transmit the data transmission without rate matching and may notify UEs of the absence of rate matching, may perform a default behavior (e.g., defined at the base station), among other examples. Additionally, the base station may transmit the control information including information notifying UEs of the use of puncturing (e.g., notifying UEs to drop REs associated with the other channels and signals). In some examples, the base station may determine to transmit the data transmission and the other channels and signals using spatial separation. As such, the base station may indicate the use of spatial separation, without puncturing, in the control information. In some examples, the base station may determine to transmit the data transmission and the other channels and signals using puncturing. As such, the base station may indicate that the data transmission was punctured by another channel or signal.

Aspects of the disclosure are initially described in the context of wireless communications systems. Aspects of the disclosure are then described in the context of a mapping configuration and a process flow. Aspects of the disclosure are further illustrated by and described with reference to apparatus diagrams, system diagrams, and flowcharts that relate to notification of puncturing a physical downlink shared channel.

FIG. 1 illustrates an example of a wireless communications system 100 that supports notification of puncturing a physical downlink shared channel in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation). In some cases, beamforming may be used to spatially separate one or more signals or communication links. For example, a base station 105 may transmit a first communication to a UE 115 using a first beam and may transmit a second communication to the UE 115 using a second beam, spatially separating the first communication and the second communication.

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some wireless communications systems may support collision type notifications such that a base station 105 may notify a UE 115 of a collision as well as a type of transmission associated with the collision (e.g., spatial separation or puncturing). For example, the base station 105 may transmit control information to the UE 115 notifying the UE 115 of channels and reference signals (e.g., SSBs, CORE-SETs, CSI-RS) associated with different beams, cells, among other sectors. In such examples, the base station 105 may determine to transmit a data transmission to the UE 115, for example, using REs overlapping with the other channels and signals (e.g., known to the UE 115). In some examples, the base station 105 may evaluate whether it may be able to spatially separate the non-rate matched channels and signals and the data transmission. In examples where the base station 105 completes the evaluation in time for the transmission of the colliding data transmission and the other channels and signals, the base station 105 may transmit the control information including information notifying UEs 115 of the use of spatial separation. In some examples, the base station 105 may determine to transmit the data transmission and the other channels and signals using spatial separation. As such, the base station 105 may indicate the use of spatial separation in the control information and may refrain from rate matching the data transmission with the other channels and signals. In some examples, the base station 105 may determine to transmit the data transmission and the other channels and signals without using spatial separation. As such, the base station 105 may indicate transmission without spatial separation in the control information and may rate match the data transmission with the other channels and signals. The UE 115 may identify the rate matching indication and may receive the data transmission in accordance with the rate matching around the other channels and signals.

In examples where the base station 105 fails to complete the evaluation in time for the transmission of the colliding data transmission and other channels and signals, the base station 105 may transmit the data transmission without rate matching. Additionally, the base station 105 may transmit the control information including information notifying UEs 115 of the use of puncturing (e.g., notifying UEs 115 to drop REs associated with the other channels and signals). In some examples, the base station 105 may determine to transmit the data transmission and the other channels and signals using spatial separation. As such, the base station 105 may indicate the use of spatial separation, without puncturing, in the control information. In some examples, the base station 105 may determine to transmit the data transmission and the other channels and signals using puncturing. As such, the base station 105 may indicate that the data transmission was punctured by another channel or signal. In some examples, the UE 115 may decode the data transmission while puncturing one or more log likelihood ratios (LLRs) of the REs of the collisions.

Figure 2:
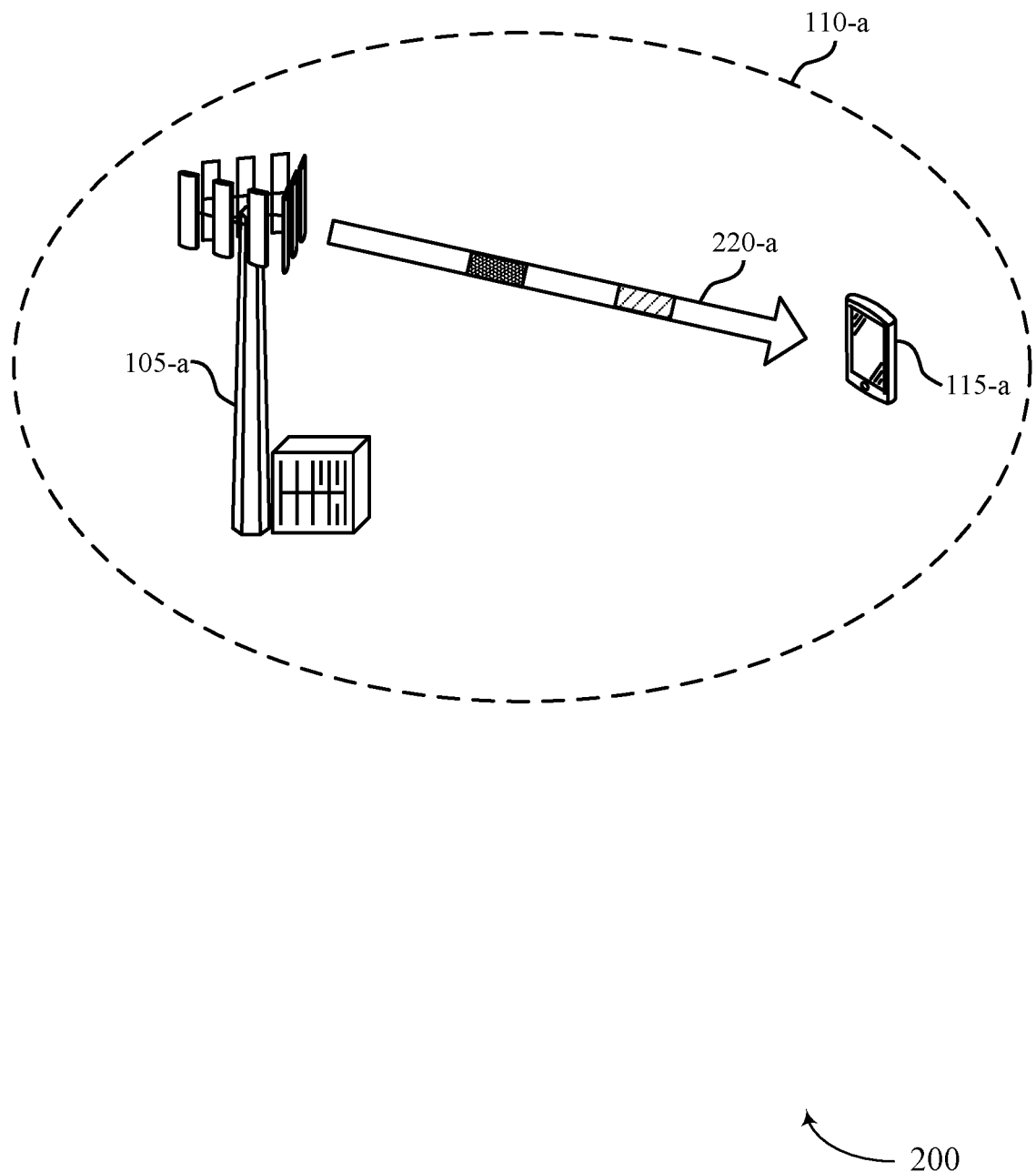

FIG. 2 illustrates an example of a wireless communications system 200 that supports notification of puncturing a PDSCH in accordance with aspects of the present disclosure. The wireless communications system 200 may implement or be implemented by aspects of the wireless communications system 100. For example, the wireless communications system 200 may include a base station 105-a and a UE 115-a, which may be examples of corresponding devices described with reference to FIG. 1. The base station 105-a may communicate with the UE 115-a in a geographic coverage area 110-a, which may be an example of a geographic coverage area 110 described with reference to FIG. 1. In some examples, the base station 105-a may transmit control information 205 (e.g., a downlink control information (DCI) message) including PDSCH collision information, where the UE 115-a may receive the control information 205 and may identify a configuration for receiving data transmission 210.

In some cases, the base station 105-a may transmit the data transmission 210 to UE 115-a using communication link 220-a and may transmit the data transmission 210 (e.g., PDSCH) in accordance with a PDSCH transmission flow. For example, after scrambling and modulating data transmission 210, the base station 105-a may map the data transmission 210 to one or more layers (e.g., logical layers, protocol layers) and one or more antenna ports. Additionally, the base station 105-a may map the data transmission 210 to one or more VRBs (e.g., logical resource blocks). For example, the base station 105-a may map modulated PDSCH symbols to the REs of a VRB. In some cases, the base station 105-a may refrain from mapping data transmission 210 to specific REs, leaving gaps in a VRB which may be filled, or otherwise occupied by other signals. For example, the base station 105-a may refrain from mapping data transmission 210 to a first pattern of REs within a VRB, where the first pattern of REs may be associated with specific signals and channels, such as SSBs, PDCCH, periodic CSI-RS (P-CSI-RS), semi-persistent CSI-RS (SP-CSI-RS), non-zero power CSI-RS (NZP-CSI-RS), zero power CSI-RS (ZP-CSI-RS) (e.g., including TRS), CORESETs, cell specific reference signals (CRSs), among other signals and channels. Mapping data transmission 210 around the REs of such signaling may be equivalently referred to as "rate matching." In some cases, the base station 105-a may map data transmission 210 to specific REs, even though one or more other channels and signals may be transmitted on those specific REs. For example, the base station 105-a may transmit data transmission 210 on the same REs that the base station 105-a transmits specific channels such as SSBs of non-serving cells (e.g., base stations 105 the UE 115-a may not be connected to), PDCCH messages not scheduling data transmission 210 (e.g., with corresponding DMRS), among other channels. In another example, the base station 105-*a* may transmit data transmission 210 on the same REs that the base station 105-*a* transmits specific signals such as A-CSI-RS, CSI-RS for mobility, CSI-IM, PRS, LTE signals, CSI-RS QCLed to an SSB of a different sector (e.g., where CSI-RS resources may be configured per UE 115), among other signals. In other words, the base station 105-*a* may refrain from rate matching data transmission 210 with specific signals and channels. Such signals and channels may therefore be transmitted on REs occupying data transmission 210 symbols, causing collisions between signals (e.g., interference).

Some wireless communications systems may support one or more tools to introduce, or otherwise support, rate matching (e.g., around channels and signals that may not be rate matched). In some examples, the base station 105-*a* may indicate one or more reserved physical resource block (PRB)-granularity resources for semi-static transmissions such as LTE physical broadcast channel (PBCH), system information blocks (SIBs), PDCCH, among other transmissions with PRB-granularity resources (e.g., rectangular shaped in time-frequency space). For example, the base station 105-*a* may transmit an SIB to another UE 115 within a same PDSCH symbol that the base station 105-*a* transmits the data transmission 210 to the UE 115-*a*. As such, the base station 105-*a* may indicate reserved resources to the UE 115-*a*, for example, for the UE 115-*a* to rate match the data transmission 210 around REs corresponding to the SIB transmitted to the other UE 115. The base station 105-*a* may semi-statically configure a set of reserved resources and may dynamically indicate (e.g., via a downlink DCI) to the UE 115-*a* which reserved resource of the set of reserved resources to use for rate matching. In some examples, the base station 105-*a* may indicate one or more CORSETs containing PDCCH(s), and in some cases, corresponding PDCCH DMRS. For example, the base station 105-*a* may indicate a CORESET to another UE 115 within a same PDSCH symbol that the base station 105-*a* transmits the data transmission 210 to the UE 115-*a*. As such, the base station 105-*a* may indicate reserved resources to the UE 115-*a*, for example, for the UE 115-*a* to rate match the data transmission 210 around REs corresponding to the CORESET transmitted to the other UE 115. In some examples, the base station 105-*a* may transmit, to the UE 115-*a*, one or more ZP-CSI-RSs (e.g., indicated in a downlink DCI such as a DCI scheduling data transmission 210) to rate match data transmission 210 around A-CSI-RS, CSI-RS for mobility, CSI-IM, CSI-RSs QCLed to an SSB of another sector or UE 115 (e.g., as CSI-RS resources may be configured per UE 115), among other CSI-RS not configured to the UE 115-*a*. For example, the base station 105-*a* may transmit an A-CSI-RS to another UE 115 within a same PDSCH symbol that the base station 105-*a* transmits the data transmission 210 to the UE 115-*a*. As such, the base station 105-*a* may transmit ZP-CSI-RS to the UE 115-*a*, for example, for the UE 115-*a* to receive data transmission 210 rate matched around REs corresponding to the A-CSI-RS transmitted to the other UE 115.

However, in some cases, collisions between the data transmission 210 and other signals and channels may occur, for example, due to a UE capability to support resource patterns, network configuration procedures, or a combination thereof. For example, the UE 115-*a* may support up to a quantity of reserved resource patterns or CORESET patterns (e.g., eight reserved resource patterns or CORESET patterns). That is, the UE 115-*a* may support up to a specific quantity of resource patterns per symbol and slot (e.g., as per a capability 2-23*a*). Further, the base station 105-*a* may configure ZP-CSI-RSs, reserved resources, and CORESET patterns semi-statically. In such cases, the base station 105-*a* may fail to configure the UE 115-*a* with a specific CSI-RS and other interfering signaling, for example, the UE 115-*a* may not support a pattern associated with the specific CSI-RS or other interfering signaling. Additionally or alternatively, the base station 105-*a* may transmit a dynamic trigger in a downlink DCI which may not capture, or otherwise indicate a configuration supported by the UE 115-*a*.

In scenarios where other signals and channels interfere with data transmission 210, the base station 105-*a* may transmit the data transmission 210 and overlapping channels and signals according to one or more possible behaviors. In some examples, the base station 105-*a* (e.g., a massive MIMO (M-MIMO) gNB, such as a gNB with 64 antenna ports, supporting THz communications, supporting relatively small beam widths as compared to a non M-MIMO gNB) may transmit the data transmission 210 and overlapping channels and signals, for example, transmitting data transmission 210 to the UE 115-*a* using a first spatial layer and one or more CSI-RSs to another UE 115 using a second spatial layer on REs overlapping with the data transmission 210. Transmitting data transmission 210 and overlapping channels and signals may be referred to equivalently as "spatial separation." In some examples, the base station 105-*a* (e.g., a non M-MIMO gNB) may not be able to transmit data transmission 210 and overlapping channels and signals, and thus, may drop PDSCH symbols mapped to the overlapping resources. Transmitting data transmission 210 and overlapping channels and signals and dropping the PDSCH symbols mapped to the overlapping resources may be equivalently referred to as "puncturing."

Some wireless communications systems may support URLLC communications, where in such wireless communications systems, base stations 105 may be configured to indicate collisions between URLLC transmissions and PDSCH resources (e.g., eMBB PDSCH resources). For example, the base station 105-*a* may transmit a URLLC indication or cancellation, notifying the UE 115-*a* that the data transmission 210 was punctured or may be rate matched by a URLLC signal. In some examples, the base station 105-*a* may transmit a URLLC indication (e.g., postmortem) to the UE 115-*a*, the URLLC indication notifying the UE 115-*a* that the data transmission 210 was punctured by a URLLC signal, for example, a URLLC signal from another UE 115. In such examples, the base station 105-*a* may transmit a DCI with format 2_1 to the UE 115-*a*, the DCI including one or more URLLC resources that punctured the data transmission 210. For example, the base station 105-*a* may transmit the DCI indicating a puncturing URLLC resource pattern to the UE 115-*a*. The base station 105-*a* may broadcast or unicast the DCI with the used allocations of the URLLC signal. UEs 115 receiving the DCI may determine the URLLC resources to be interference and may drop the REs corresponding to the URLLC signaling. In some examples, the base station 105-*a* may transmit a URLLC cancellation (e.g., preemption) to the UE 115-*a*, the URLLC cancellation notifying the UE 115-*a* that the data transmission 210 may be rate matched by, or around a URLLC signal. In such examples, the base station 105-*a* may transmit a DCI with format 2_4 to the UE 115-*a*, the DCI including one or more URLLC resources that may not be available to data transmission 210. In other words, the DCI may indicate the URLLC resources the data transmission 210 may be rate matched around. For example, the base station 105-a may transmit the DCI indicating a URLLC rate matching pattern to the UE 115-a. The base station 105-a may broadcast or unicast the DCI with the allocations of the URLLC signal. UEs 115 receiving the DCI may rate match relevant data channel (e.g., PUSCH, PDSCH) resources, for example, such UEs 115 may receive the data transmission 210 around the URLLC resources.

However, in some cases, the UE 115-a may lack the knowledge to optimize, or otherwise improve signal reception under collision conditions (e.g., data transmission 210 colliding or interfering with other channels and signals). In some cases, the UE 115-a may not be aware of a collision between the data transmission 210 and other channels and signals. For example, the base station 105-a may transmit the data transmission 210 to the UE 115-a using time-frequency resources that overlap with a CSI-RS QCLed to another sector (e.g., another UE 115). Additionally, even if the UE 115-a is aware of the collision between the data transmission 210 and the other channels and signals (e.g., uplink/common DCI, A-CSI-RS), the UE 115-a may lack information about whether the base station 105-a transmitted the data transmission 210 and the other channels and signals using spatial separation or using puncturing. Lacking knowledge of such collisions and lacking knowledge about whether the base station transmits the data transmission and other channels and signals using spatial separation or puncturing may result in diminished performance. In cases where the base station 105-a transmits the data transmission 210 using puncturing, but the UE 115-a lacks knowledge of such puncturing, the UE 115-a may use the punctured data transmission 210 REs for demodulation, reducing the reception performance even through the base station 105-a had information that the data transmission 210 was punctured. That is, the base station 105-a may not share such puncturing information with the UE 115-a, resulting in the UE 115-a decoding the data transmission 210 in REs that may be interfered with by other channels and signals. In cases where the base station 105-a transmits the data transmission 210 using spatial separation, but the UE 115-a is not aware of the collision between the data transmission 210 and other channels and signals, the UE 115-a may demodulate the data transmission 210 without advanced reception methods, for example, to adapt to the spatial separation of the signals. That is, the UE 115-a, unaware of spatial separation, may forego using an advanced receiver to distinguish between the spatial layers used to transmit the data transmission 210 and the other channels and signals resulting in diminished reception performance of the data transmission 210.

Some wireless communications systems may support collision type notifications such that a base station 105 may notify a UE 115 of a collision as well as a type of transmission associated with the collision (e.g., spatial separation or puncturing). In some examples, the base station 105-a may configure UEs 115 with multiple channels and signals. For example, the base station 105-a may transmit control information 205 to the UE 115-a notifying the UE 115-a of channels and reference signals (e.g., SSBs, CORESETs, CSI-RS) associated with different beams, cells, among other sectors. Each channel may be radio resource control (RRC) configured (e.g., semi-statically configured) and the base station 105-a may apply a default rate matching behavior (e.g., non-rate matched transmissions). For example, an A-CSI-RS may be non-rate matched by default and may be configured according to a downlink and an uplink scheduler implementation at the base station 105-a. That is, the base station 105-a may use a downlink or an uplink scheduler to configure the A-CSI-RS, for example, configuring the A-CSI-RS without rate matching. In another example, a CSI-RS for mobility may be non-rate matched by default and may be configured in accordance with a configuration of a neighboring base station 105 (e.g., a base station 105 for a UE 115 to be handed over to or for a UE 115 to be handed over from).

The base station 105-a may determine to transmit the data transmission 210 to the UE 115-a, for example, using REs overlapping with the other channels and signals (e.g., known to the UE 115-a). In some examples, the base station 105-a may evaluate whether it may be able to spatially separate the non-rate matched channels and signals and the data transmission 210. For example, the base station 105-a may determine whether to transmit an A-CSI-RS using a first spatial layer and on REs overlapping with the data transmission 210 transmitted using a second spatial layer.

In examples where the base station 105-a completes the evaluation in time for the transmission of the colliding data transmission 210 and the other channels and signals, the base station 105-a may transmit the control information 205 including information notifying UEs 115 of the use of spatial separation. For example, the base station 105-a may transmit the control information 205 as a DCI scheduling the data transmission 210, where the DCI may include a field (e.g., a bit field, an additional field, a reserved field) indicating whether spatial separation may apply to non-rate matched channels and signals. In some examples, the base station 105-a may determine to transmit the data transmission 210 and the other channels and signals using spatial separation. As such, the base station 105-a may indicate the use of spatial separation in the control information 205 and may refrain from rate matching the data transmission 210 with the other channels and signals. In some examples, the UE 115-a may receive the data transmission 210 using an advanced receiver, for example, to distinguish between the spatial layers associated with the data transmission 210 and the other channels and signals. In some examples, the base station 105-a may determine to transmit the data transmission 210 and the other channels and signals without using spatial separation. As such, the base station 105-a may indicate transmission without spatial separation in the control information 205 and may rate match the data transmission 210 with the other channels and signals. The UE 115-a may identify the rate matching indication and may receive the data transmission 210 in accordance with the rate matching around the other channels and signals.

In examples where the base station 105-a fails to complete the evaluation in time for the transmission of the colliding data transmission 210 and other channels and signals, the base station 105-a may transmit the data transmission 210 without rate matching. Further, in examples where the base station has insufficient information to complete the evaluation (e.g., when one or more other signals are transmitted from another base station), the base station may transmit the data transmission without rate matching. Additionally, the base station 105-a may transmit the control information 205 including information notifying UEs 115 of the use of puncturing, for example, much like the URLLC indication. In some examples, the base station 105-a may determine to transmit the data transmission 210 and the other channels and signals using spatial separation. As such, the base station 105-a may indicate the use of spatial separation, without puncturing, in the control information 205. In some examples, the UE 115-a may receive the data transmission 210 using an advanced receiver. In some examples, the base station 105-a may determine to transmit the data transmission 210 and the other channels and signals using puncturing. As such, the base station 105-*a* may indicate that the data transmission 210 was punctured by another channel or signal. In such examples, the base station 105-*a* may transmit the control information 205 including one or more resources associated with puncturing the data transmission 210. For example, the base station 105-*a* may transmit the control information 205 indicating a puncturing resource pattern to the UE 115-*a*. UEs 115 receiving the DCI may determine the URLLC resources to be interference and may drop the REs corresponding to the URLLC signaling. In some examples, the UE 115-*a* may decode the data transmission 210 while puncturing the LLRs of the REs of the collisions.

Enabling base stations 105 to transmit collision type notifications (e.g., spatial separation or puncturing) may provide UEs 115 with information about potentially interfering signaling and may enable UEs 115 to receive and decode data transmissions 210 in accordance with a transmission scheme of such interfering signaling. That is, notifying UEs 115 of whether data transmission 210 and other channels and signals are transmitted using spatial separation or puncturing may reduce signal interference, increase signal throughput, and enhance coordination between communicating devices.

Figure 3A:
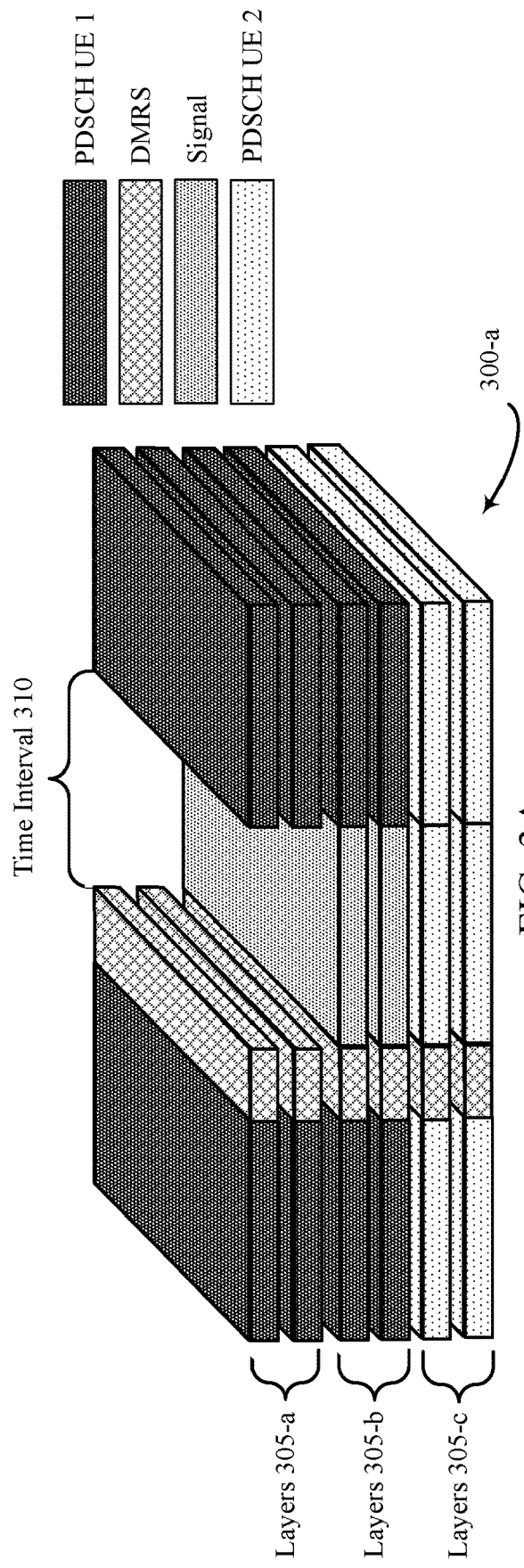
FIG. 3A and FIG. 3B each illustrates an example of a mapping configuration that supports notification of puncturing a PDSCH in accordance with aspects of the present disclosure.
Figure 3B:
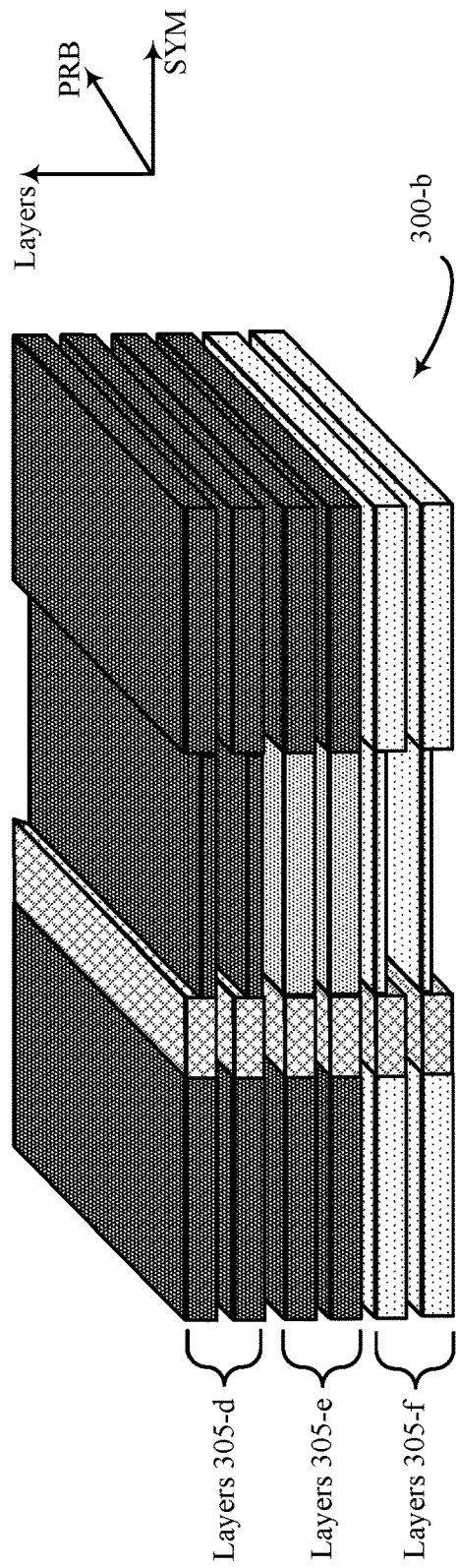

FIGS. 3A and 3B illustrate examples of mapping configurations 300 that support notification of puncturing a PDSCH in accordance with aspects of the present disclosure. In some examples, the mapping configurations 300 may implement aspects of wireless communications system 100 or 200. In this example, a base station (e.g., base station 105-*a* as described with reference to FIG. 2) may transmit signaling on one or more layers 305 to one or more UEs (e.g., UE 115-*a* and UE 115-*b* as described with reference to FIG. 2), and may further transmit control information (e.g., control information 205 as described with reference to FIG. 2) including collision type notifications notifying UEs of signal collisions as well as a transmission types (e.g., spatial separation or puncturing) associated with the collisions.

FIG. 3A depicts a mapping configuration 300-*a*, where the base station may transmit data messages to one or more UEs using one or more layers, for example, rate matching around specific signals. In some examples, the base station may transmit signaling to one or more UEs using one or more layers 305. For example, the base station may transmit signaling to a first UE using layers 305-*a* and layers 305-*b* and signaling to a second UE using layers 305-*c*. In some cases, the layers 305 may be examples of different, orthogonal spatial layers (e.g., beams), logical layers (e.g., protocol layers), virtual layers, among other layers. For example, the base station may transmit the layers 305-*a* and the layers 305-*b* to the first UE using four different layers and the base station may transmit the layers 305-*c* to the second UE using two different layers. In some cases, the base station may transmit a combination of PDSCH (e.g., data transmissions 210 as described with reference to FIG. 2), DMRS, and other signals, in particular configurations, to the one or more UEs. For example, the base station may transmit PDSCH, DMRS, and one or more CSI-RSs to the first UE using the layers 305-*a*.

In some examples, the base station may notify UEs of signal collisions as well as transmission types (e.g., spatial separation or puncturing) associated with the collisions. In some examples, the base station may transmit control information to a UE notifying the UE of channels and reference signals (e.g., SSBs, CORESETs, CSI-RS) associated with different beams, cells, among other sectors. For example, the base station may transmit control information to the second UE notifying the second UE of signals such as A-CSI-RSs transmitted to the first UE during time interval 310 on layers 305-*b*. That is, the base station may transmit control information to second UE notifying the second UE that one or more signals may occupy symbols, REs, PRBs, minimal transmission intervals (MTIs), slots, or another other time interval 310 that may have otherwise been occupied by PDSCH signaling. For example, the mapping configuration 300-*a* may illustrate mapping signals to layers 305 during a slot, where the base station may notify the second UE that one or more signals may override PDSCH symbols of the time interval 310 (e.g., symbols indexed 6 through 9). In some examples, the base station may determine to transmit PDSCH to the second UE, for example, during REs overlapping with the other channels and signals (e.g., time interval 310). That is, the base station may determine to apply a default rate matching behavior, for example, refraining from rate matching the PDSCH to the second UE around other signaling (e.g., reference signals, CORESETs) to the first UE.

In some examples, the base station may evaluate whether it may be able to spatially separate the transmissions to the UEs. In other words, the base station may determine whether it may be able to transmit PDSCH to the second UE and signaling to the first UE on layers 305-*c* and on layers 305-*a* and layers 305-*b*, respectively, such that the second UE and the first UE may distinguish and decode between the different layers 305. For example, the base station may determine whether it may be able to transmit an A-CSI-RS to the first UE during time interval 310 using layers 305-*b* and PDSCH to the second UE during time interval 310 using layers 305-*c*. In examples where the base station completes the evaluation in time for the transmission of the colliding transmissions to the first UE and the second UE, the base station may transmit control information including information notifying UEs of the use of spatial separation. For example, the base station may transmit a DCI to the second UE scheduling PDSCH (e.g., during time interval 310), where the DCI may include a field (e.g., a bit field, an additional field, a reserved field) indicating whether spatial separation may apply to non-rate matched channels and signals (e.g., signaling to the first UE during time interval 310). In some examples, the base station may determine to transmit the transmissions to the first UE and the second UE using spatial separation. As such, the base station may indicate the use of spatial separation in the control information and may refrain from rate matching the PDSCH for the second UE with the signaling to the first UE during time interval 310. In such examples, the second UE may receive the PDSCH using an advanced receiver, for example, to distinguish between the layers 305-*c* and the layers 305-*b*. In some examples, the base station may determine to transmit the PDSCH to the second UE and the signaling to the first UE without using spatial separation. As such, the base station may indicate transmission without spatial separation in the control information and may rate match the PDSCH to the second UE around signaling to the first UE. In such examples, the second UE may identify the rate matching indication and may receive the PDSCH in accordance with the rate matching around signaling to the first UE during time interval 310. In examples where the base station fails to complete the evaluation in time for the transmission of the colliding transmissions to the first UE and the second UE, the base station may transmit the PDSCH to the second UE without rate matching. Additionally, the base station may transmit the control information including information notifying UEs of the use of puncturing, for example, much like the URLLC indication. In some examples, the base station may determine to transmit the transmissions to the first UE and the second UE using spatial separation. As such, the base station may indicate the use of spatial separation in the control information and may refrain from rate matching the PDSCH for the second UE with the signaling to the first UE during time interval 310. In such examples, the second UE may receive the PDSCH using an advanced receiver, for example, to distinguish between the layers 305-c and the layers 305-b. In some examples, the base station may determine to transmit the PDSCH to the second UE and the signaling to the first UE using puncturing. As such, the base station may indicate, to the second UE, that the PDSCH was punctured by the signaling to the first UE during time interval 310. In such examples, the base station may transmit the control information including one or more resources associated with puncturing the PDSCH to the second UE. For example, the base station may transmit the control information as a DCI indicating a puncturing resource pattern to the second UE. Upon receiving the DCI, the second UE may determine the indicated puncturing resources to be associated with interference and may drop the REs corresponding to the puncturing resource pattern.

In some examples, a single UE may receive multiple layers 305. For example, the first UE may receive both layers 305-a and layers 305-b. In some examples, the first UE may receive a first data flow on layers 305-a and a second data flow on layers 305-b. In other examples, the first UE may receive a single data flow on layers 305-a and 305-b, where the signal interferes with layers 305-b during time interval 310. In some examples, the base station may transmit layers 305 to the first UE and the second UE spatially separating some layers, while refraining from spatially separating others. For example, the base station may transmit the layers 305-b to the first UE with an A-CSI-RS during time interval 310, transmit the layers 305-c to the second UE spatially separating the layers 305-b and the layers 305-b, and transmit the layers 305-a without spatially separating the layers 305-b and the layers 305-b. Such examples may be particularly relevant for multi-TRP reception of layers 305 from different TRPs (e.g., different TRPs at the same receiver).

FIG. 3B depicts a mapping configuration 300-b, where the base station may transmit layers 305 to the first UE and the second UE, for example, refraining from linking transmissions to reference signals. For example, the base station may transmit layers 305-d and layers 305-e to the first UE and transmit layers 305-f to the second UE puncturing the transmissions with A-CSI-RS. In such examples, the base station may transmit the layers 305-d and layers 305-e to the first UE and may transmit the layers 305-f to the second UE without spatial separation, rate matching, or a combination thereof.

Figure 4:
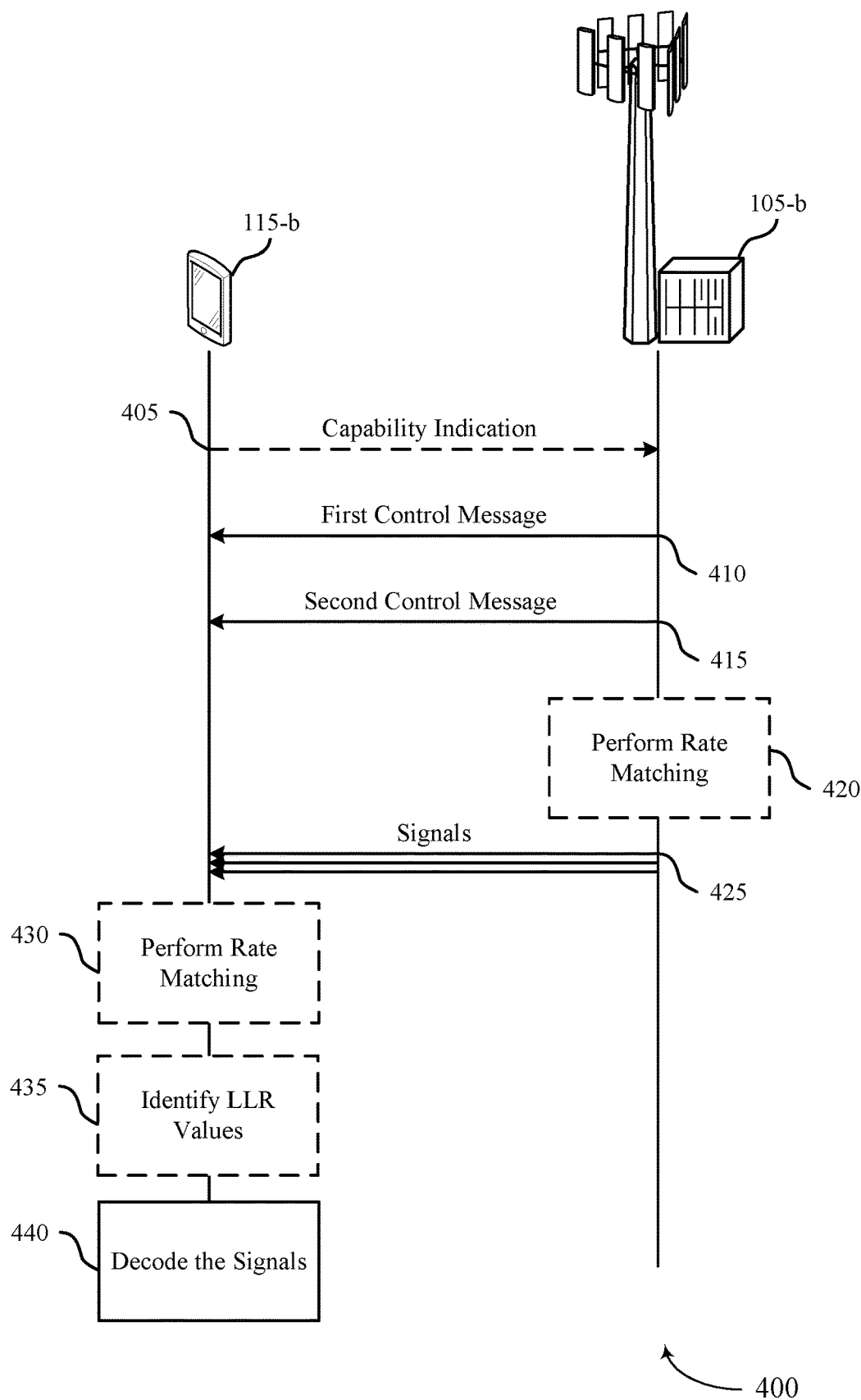
FIG. 4 illustrates an example of a process flow that supports notification of puncturing a PDSCH in accordance with aspects of the present disclosure.

FIG. 4 illustrates an example of a process flow 400 that supports notification of puncturing a PDSCH in accordance with aspects of the present disclosure. In some examples, the process flow 400 may implement aspects of wireless communications systems 100 or 200. For example, process flow 400 may include a UE 115-b and a base station 105-b, which may be examples of corresponding devices as described with reference to FIGS. 1 through 3. In some cases, the base station 105-b may transmit control information including collision notification for the UE 115-b to receive subsequent signaling using rate matching, spatial separation, or puncturing based on the control information.

In the following description of the process flow 400, the operations may be performed (e.g., reported or provided) in a different order than the order shown, or the operations performed by the UE 115-b and the base station 105-b may be performed in different orders or at different times. For example, specific operations also may be left out of the process flow 400, or other operations may be added to the process flow 400. Further, although some operations or signaling may be shown to occur at different times for discussion purposes, these operations may actually occur at the same time.

In some examples, at 405, the UE 115-b may transmit, and the base station 105-b may receive, a capability indication identifying that the UE 115-b is capable of receiving a control message that includes an indication of whether the base station 105-b may spatially separate signaling, for example, on a set of resources from signals on a downlink channel.

At 410, the base station 105-b may transmit, and the UE 115-b may receive a first control message identifying a set of resources used by the base station to transmit to at least another UE (not shown). In some examples, the set of resources may include resources for SSBs, CORESETs, CSI-RSs, a PBCH, SIBs, control channels, or a combination thereof, used by the base station 105-b to transmit to at least the other UE.

At 415, the base station 105-b may transmit, and the UE 115-b may receive a second control message including an indication of whether the base station 105-b has spatially separated signals transmitted by the base station 105-b on the set of resources from signals of a downlink channel transmitted to the UE 115-b by the base station 105-b. In some examples, the downlink channel may be associated with a first transmit beam and a first cell, and the set of resources used by the base station to transmit to at least the other UE may be associated with a different transmit beam, a different cell, or both.

In some examples, the base station 105-b may transmit, and the UE 115-b may receive, in the second control message, both the indication and scheduling for signals on the downlink channel. In such examples, at 425, the base station 105-b may transmit, and the UE 115-b may receive and decode, signals on the downlink channel based at least in part on the indication received in the second control message. In some examples, the UE 115-b may receive signals on at least a portion of the downlink channel that overlaps with at least a portion of the set of resources based at least in part on receiving the indication that the base station has spatially separated signals on the set of resources from signals of the downlink channel. That is, the second control message may indicate that the base station 105-b spatially separated transmissions to the UE 115-b and the other UE and the UE 115-b may receive the signals based thereon (e.g., using an advanced receiver). As such, at 440, the UE 115-b may decode the received signals. In other examples, at 420, the base station 105-b may perform, based at least in part on transmitting the indication that the base station has not spatially separated signals on the set of resources from signals of the downlink channel, rate matching around the set of resources to transmit the signals. As such, the UE 115-b may receive the signals at 425, and may identify that the signals are rate matched around the set of resources. In such examples, at 430, the UE 115-b may perform, based at least in part on receiving the indication that the base station 105-b has not spatially separated signals on the set of resources from signals of the downlink channel, rate matching around the set of resources to receive the signals. At 440, the UE 115-b may decode the received signals.

In some examples, the second control message may be a second DCI message (e.g., DCI format 2_1), where the base station 105-b may transmit, and the UE 115-b may receive, a first DCI message that includes scheduling information for the signals on the downlink channel, where receiving and decoding the signals on the downlink channel according to the indication includes receiving, at 425, the signals on the downlink channel according to the scheduling information, the second DCI message received after receiving the signals at 425. As such, at 440, the UE 115-b may decode the received signals according to the indication received in the second DCI message. In some examples, the indication identifies that the base station 105-b has spatially separated signals on the set of resources from signals of the downlink channel such that, at 440, the UE 115-b may decode the received signals of the downlink channel to remove interference from the signals on the set of resources. For example, the UE 115-b may receive and decode the signals using an advanced receiver that enables the UE 115-b to distinguish between communication layers (e.g., protocol layers, logical layers, physical layers) and remove interference from the signals. In some examples, the indication may identify that the base station 105-b has punctured signals on the downlink channel with signals on the set of resources such that, at 435, the UE 115-b may identify one or more LLR values associated with the signals on the set of resources. In such examples, at 440, the UE 115-b may decode the received signals of the downlink channel exclusive of the one or more LLR values.

Figure 5:
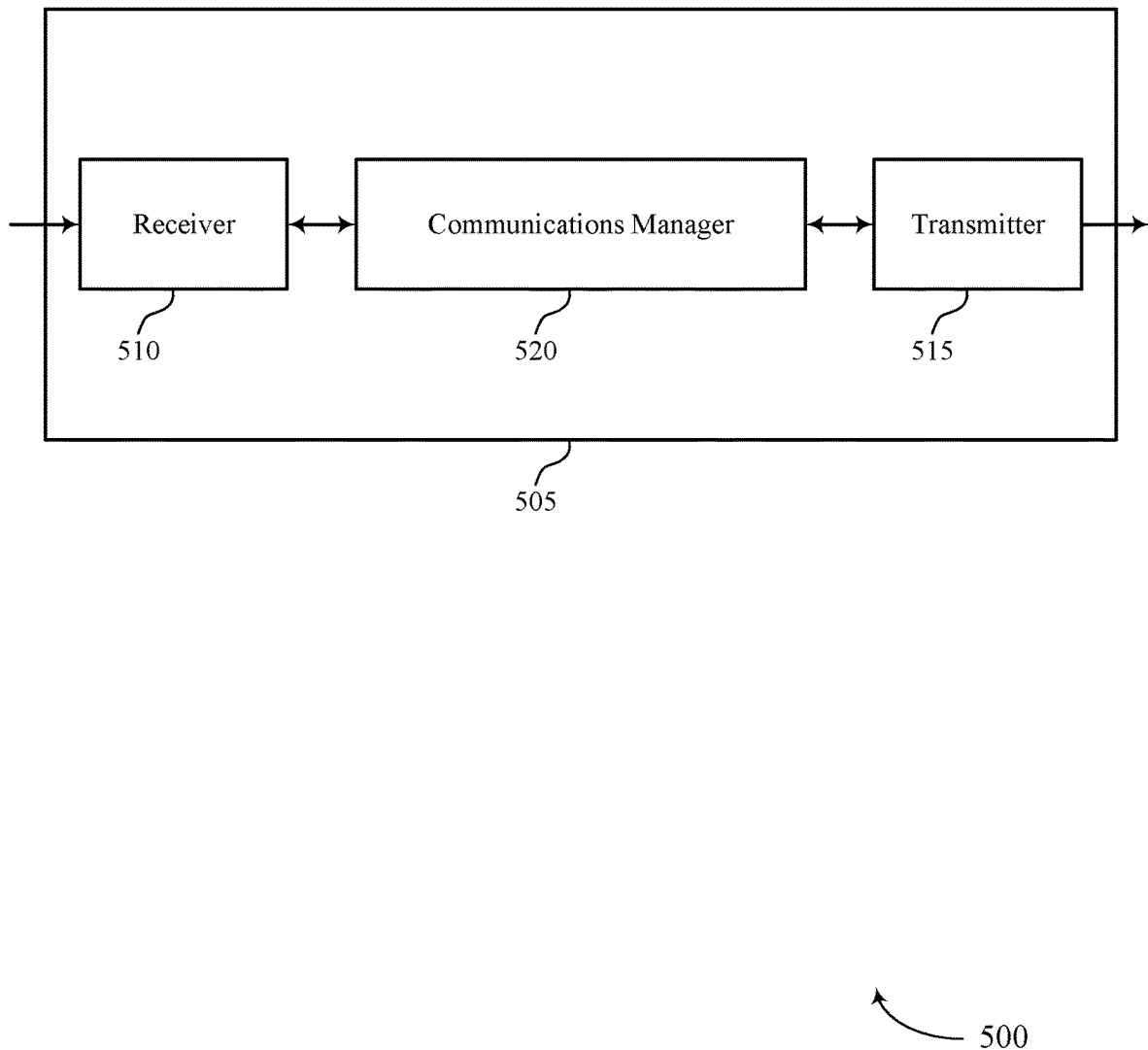
FIGS. 5 and 6 show block diagrams of devices that support notification of puncturing a PDSCH in accordance with aspects of the present disclosure.

FIG. 5 shows a block diagram 500 of a device 505 that supports notification of puncturing a physical downlink shared channel in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to notification of puncturing a physical downlink shared channel). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to notification of puncturing a physical downlink shared channel). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of notification of puncturing a physical downlink shared channel as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a base station, a first control message identifying a set of resources used for transmissions by the base station. The communications manager 520 may be configured as or otherwise support a means for receiving a second control message that includes an indication of a procedure used by the base station for a collision between the set of resources and a downlink channel transmitted to the first UE by the base station. The communications manager 520 may be configured as or otherwise support a means for receiving and decoding signals on the downlink channel according to the indicated procedure.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for receiving a PDSCH puncturing notification, notifying the UE whether a received signal was rate matched, punctured, or spatially separated, resulting in reduced processing, reduced power consumption, and more efficient utilization of communication resources.

Figure 6:
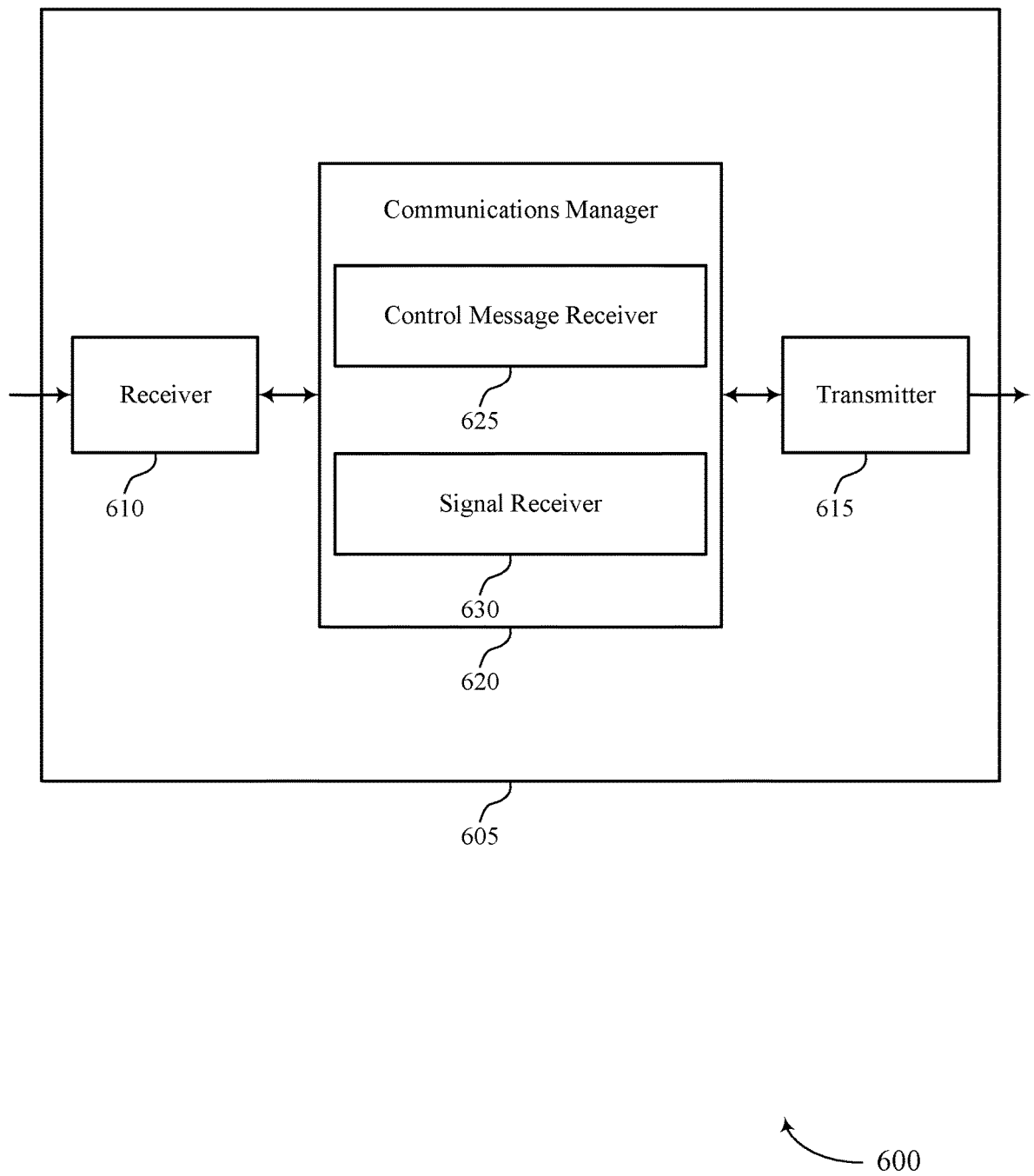

FIG. 6 shows a block diagram 600 of a device 605 that supports notification of puncturing a physical downlink shared channel in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to notification of puncturing a physical downlink shared channel). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to notification of puncturing a physical downlink shared channel). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of notification of puncturing a physical downlink shared channel as described herein. For example, the communications manager 620 may include a control message receiver 625 a signal receiver 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The control message receiver 625 may be configured as or otherwise support a means for receiving, from a base station, a first control message identifying a set of resources used for transmissions by the base station. The control message receiver 625 may be configured as or otherwise support a means for receiving a second control message that includes an indication of a procedure used by the base station for a collision between the set of resources and a downlink channel transmitted to the first UE by the base station. The signal receiver 630 may be configured as or otherwise support a means for receiving and decoding signals on the downlink channel according to the indicated procedure.

Figure 7:
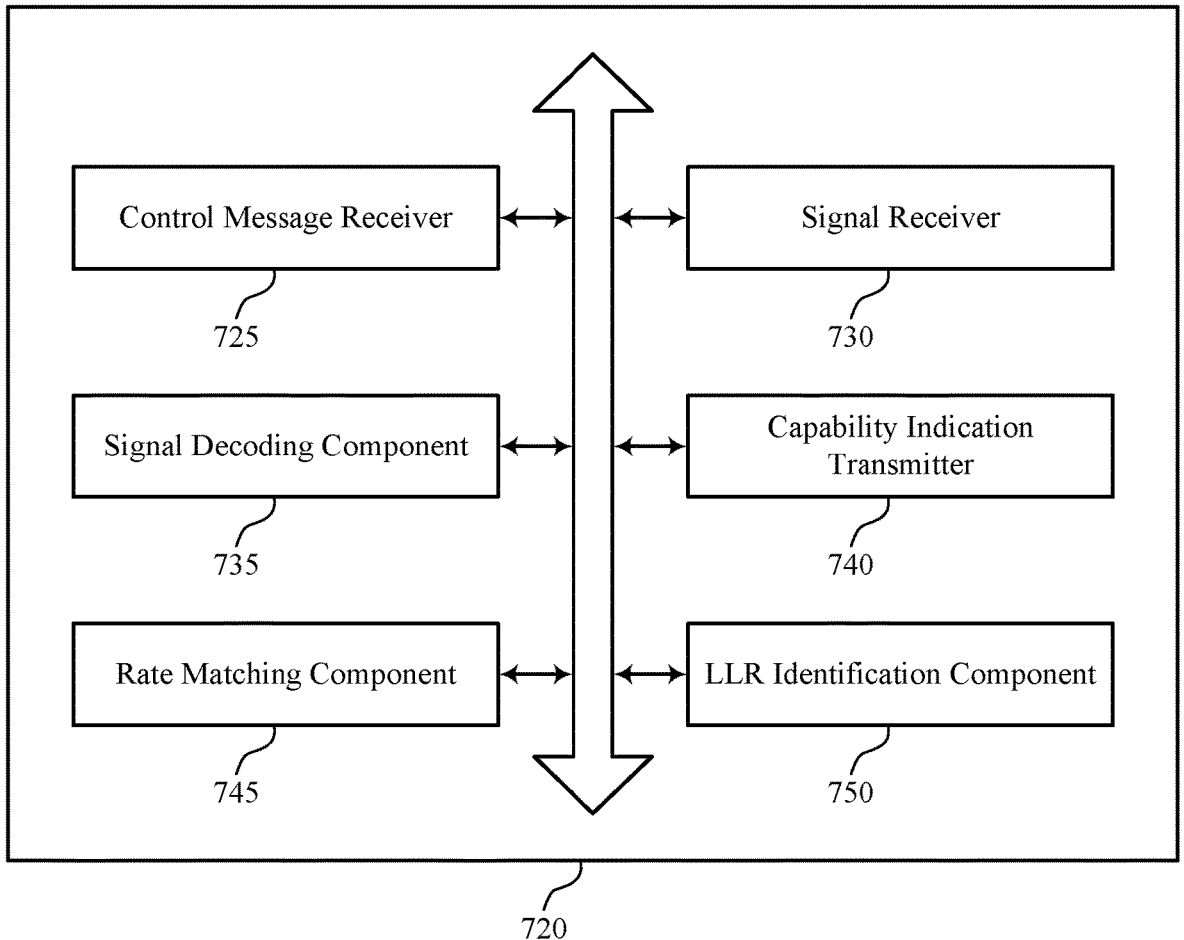
FIG. 7 shows a block diagram of a communications manager that supports notification of puncturing a PDSCH in accordance with aspects of the present disclosure.

FIG. 7 shows a block diagram 700 of a communications manager 720 that supports notification of puncturing a physical downlink shared channel in accordance with aspects of the present disclosure. The communications manager 720 may be an example of aspects of a communications manager 520, a communications manager 620, or both, as described herein. The communications manager 720, or various components thereof, may be an example of means for performing various aspects of notification of puncturing a physical downlink shared channel as described herein. For example, the communications manager 720 may include a control message receiver 725, a signal receiver 730, a signal decoding component 735, a capability indication transmitter 740, a rate matching component 745, an LLR identification component 750, or any combination thereof. Each of these components may communicate, directly or indirectly, with one another (e.g., via one or more buses).

The communications manager 720 may support wireless communication at a first UE in accordance with examples as disclosed herein. The control message receiver 725 may be configured as or otherwise support a means for receiving, from a base station, a first control message identifying a set of resources used for transmissions by the base station. In some examples, the control message receiver 725 may be configured as or otherwise support a means for receiving a second control message that includes an indication of a procedure used by the base station for a collision between the set of resources and a downlink channel transmitted to the first UE by the base station. The signal receiver 730 may be configured as or otherwise support a means for receiving and decoding signals on the downlink channel according to the indicated procedure.

In some examples, to support receiving the second control message, the control message receiver 725 may be configured as or otherwise support a means for receiving, in the second control message, both the indication and scheduling for signals on the downlink channel.

In some examples, to support receiving and decoding the signals on the downlink channel according to the indication, the signal receiver 730 may be configured as or otherwise support a means for receiving signals on at least a portion of the downlink channel that overlaps with at least a portion of the set of resources based on the indicated procedure being that the base station has spatially separated signals on the set of resources from signal of the downlink channel. In some examples, to support receiving and decoding the signals on the downlink channel according to the indication, the signal decoding component 735 may be configured as or otherwise support a means for decoding the received signals.

In some examples, to support receiving and decoding the signals on the downlink channel according to the indication, the rate matching component 745 may be configured as or otherwise support a means for performing rate matching around the set of resources to receive the signals based on the indicated procedure being that the base station has rate matched the set of resources around signals of the downlink channel. In some examples, to support receiving and decoding the signals on the downlink channel according to the indication, the signal decoding component 735 may be configured as or otherwise support a means for decoding the received signals.

In some examples, the second control message is a second downlink control information message, and the control message receiver 725 may be configured as or otherwise support a means for receiving a first downlink control information message that includes scheduling information for the signals on the downlink channel, where receiving and decoding the signals on the downlink channel according to the indication includes. In some examples, the second control message is a second downlink control information message, and the signal receiver 730 may be configured as or otherwise support a means for receiving the signals on the downlink channel according to the scheduling information, the second downlink control information message received after receiving the signals. In some examples, the second control message is a second downlink control information message, and the signal decoding component 735 may be configured as or otherwise support a means for decoding the received signals according to the indication received in the second downlink control information message.

In some examples, the indicated procedure being that the base station has spatially separated signals on the set of resources from signals of the downlink channel and, to support decoding the received signals, the signal decoding component 735 may be configured as or otherwise support a means for decoding the received signals of the downlink channel to remove interference from the signals on the set of resources.

In some examples, the indicated procedure is that the base station has punctured signals the downlink channel with signals on the set of resources and, to support decoding the received signals, the LLR identification component 750 may be configured as or otherwise support a means for identifying one or more LLR values associated with the signals on the set of resources. In some examples, the indicated procedure is that the base station has punctured signals the downlink channel with signals on the set of resources and, to support decoding the received signals, the signal decoding component 735 may be configured as or otherwise support a means for decoding the received signals of the downlink channel exclusive of the one or more LLR values.

In some examples, the capability indication transmitter 740 may be configured as or otherwise support a means for transmitting, to the base station, a capability indication identifying that the first UE is capable of receiving the indication of the procedure used by the base station for the collision between the set of resources and the downlink channel.

In some examples, the set of resources include resources for SSBs, CORESETs, channel state information reference signals, physical broadcast channel, system information blocks, control channels, or any combination thereof, used by the base station to transmit to the at least one second UE.

In some examples, the downlink channel is associated with a first transmit beam and a first cell, and the set of resources used by the base station to transmit to the at least one second UE is associated with a different transmit beam, a different cell, or both.

Figure 8:
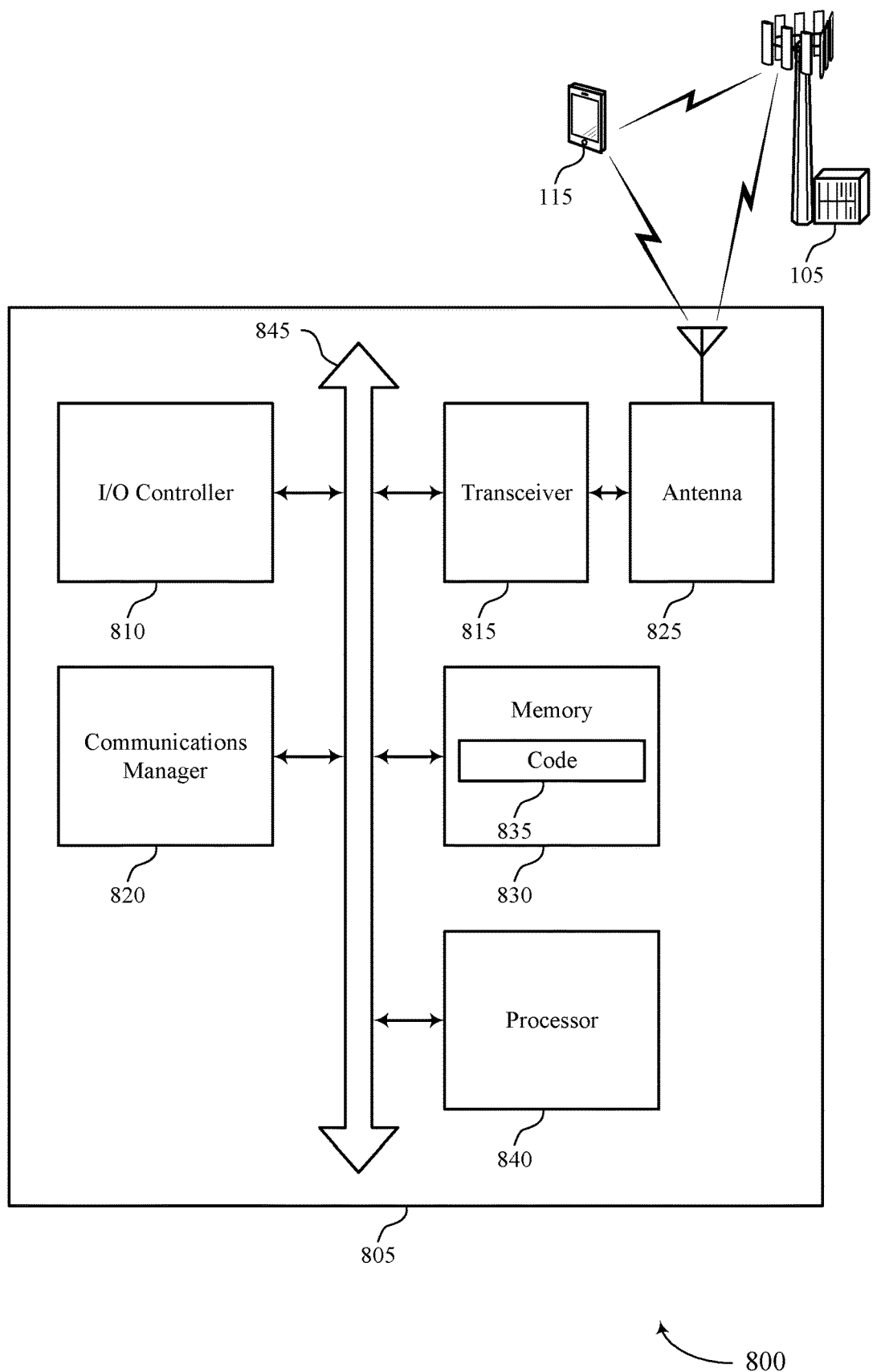
FIG. 8 shows a diagram of a system including a device that supports notification of puncturing a PDSCH in accordance with aspects of the present disclosure.

FIG. 8 shows a diagram of a system 800 including a device 805 that supports notification of puncturing a physical downlink shared channel in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting notification of puncturing a physical downlink shared channel). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a base station, a first control message identifying a set of resources used for transmissions by the base station. The communications manager 820 may be configured as or otherwise support a means for receiving a second control message that includes an indication of a procedure used by the base station for a collision between the set of resources and a downlink channel transmitted to the first UE by the base station. The communications manager 820 may be configured as or otherwise support a means for receiving and decoding signals on the downlink channel according to the indicated procedure.

By including or configuring the communications manager 820 in accordance with examples as described herein, the device 805 may support techniques for receiving a PDSCH puncturing notification, notifying the UE whether a received signal was rate matched, punctured, or spatially separated, resulting in improved communication reliability, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of notification of puncturing a physical downlink shared channel as described herein, or the processor 840 and the memory 830 may be otherwise configured to perform or support such operations.

Figure 9:
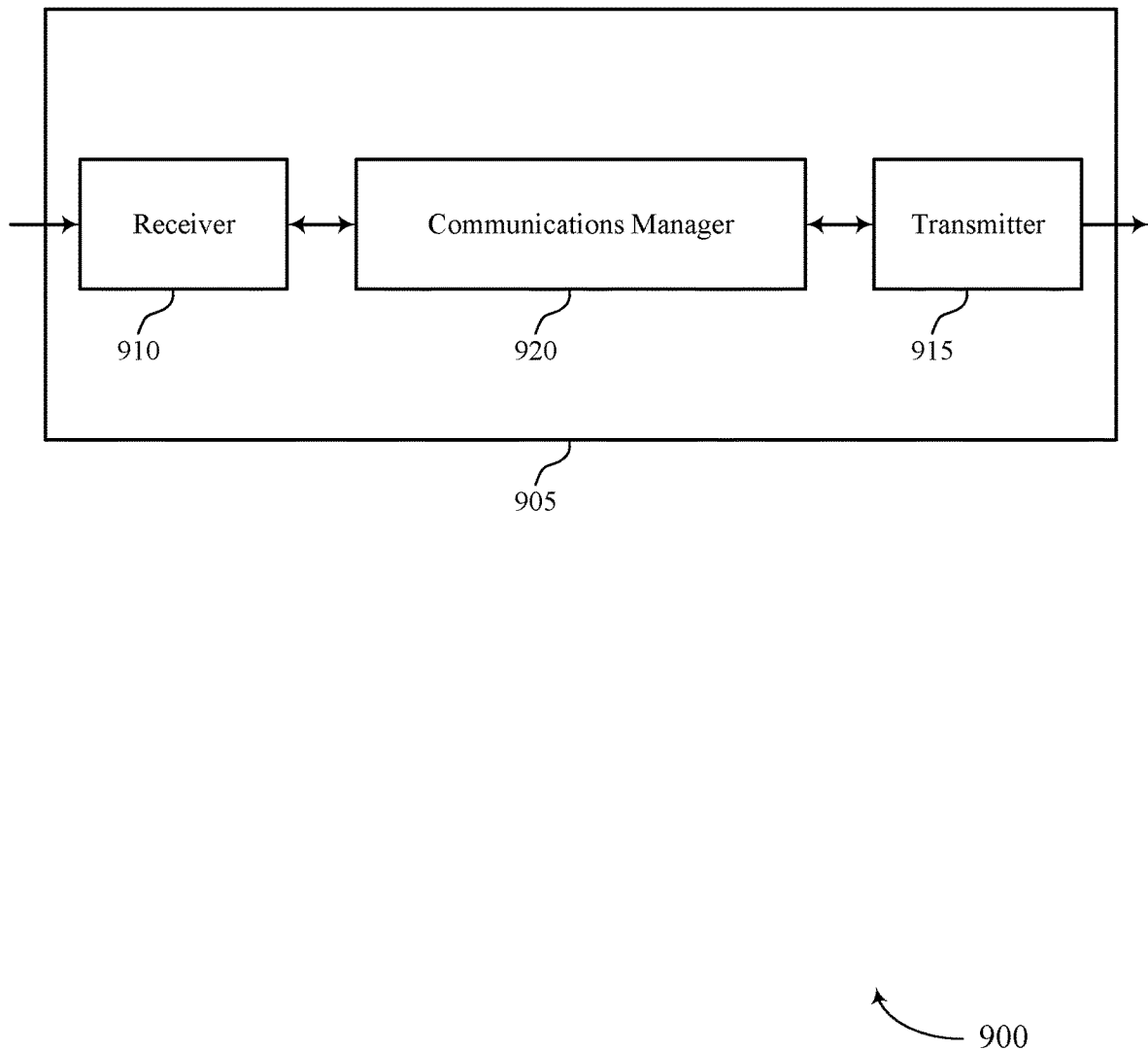
FIGS. 9 and 10 show block diagrams of devices that support notification of puncturing a PDSCH in accordance with aspects of the present disclosure.

FIG. 9 shows a block diagram 900 of a device 905 that supports notification of puncturing a physical downlink shared channel in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to notification of puncturing a physical downlink shared channel). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to notification of puncturing a physical downlink shared channel). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of notification of puncturing a physical downlink shared channel as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a first UE, a first control message identifying a set of resources used for transmissions by the base station. The communications manager 920 may be configured as or otherwise support a means for transmitting a second control message that includes an indication of a procedure used by the base station for a collision between the set of resources and a downlink channel transmitted to the first UE. The communications manager 920 may be configured as or otherwise support a means for transmitting signals on the downlink channel according to the indicated procedure.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for transmitting a PDSCH puncturing notification, notifying a UE whether a received signal was rate matched, punctured, or spatially separated, resulting in reduced processing, reduced power consumption, and more efficient utilization of communication resources.

Figure 10:
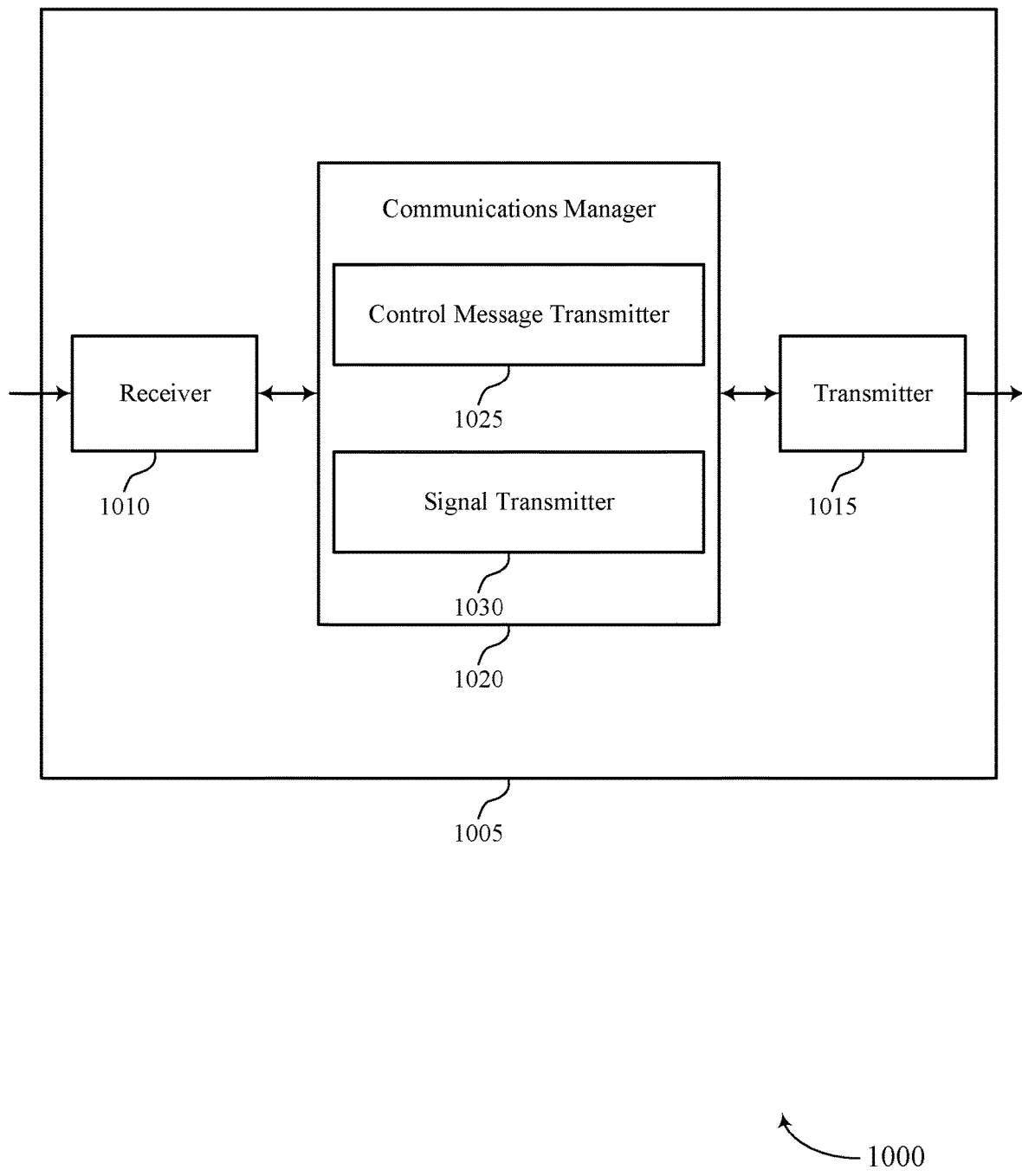

FIG. 10 shows a block diagram 1000 of a device 1005 that supports notification of puncturing a physical downlink shared channel in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to notification of puncturing a physical downlink shared channel). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to notification of puncturing a physical downlink shared channel). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of notification of puncturing a physical downlink shared channel as described herein. For example, the communications manager 1020 may include a control message transmitter 1025 a signal transmitter 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The control message transmitter 1025 may be configured as or otherwise support a means for transmitting, to a first UE, a first control message identifying a set of resources used for transmissions by the base station. The control message transmitter 1025 may be configured as or otherwise support a means for transmitting a second control message that includes an indication of a procedure used by the base station for a collision between the set of resources and a downlink channel transmitted to the first UE. The signal transmitter 1030 may be configured as or otherwise support a means for transmitting signals on the downlink channel according to the indicated procedure.

Figure 11:
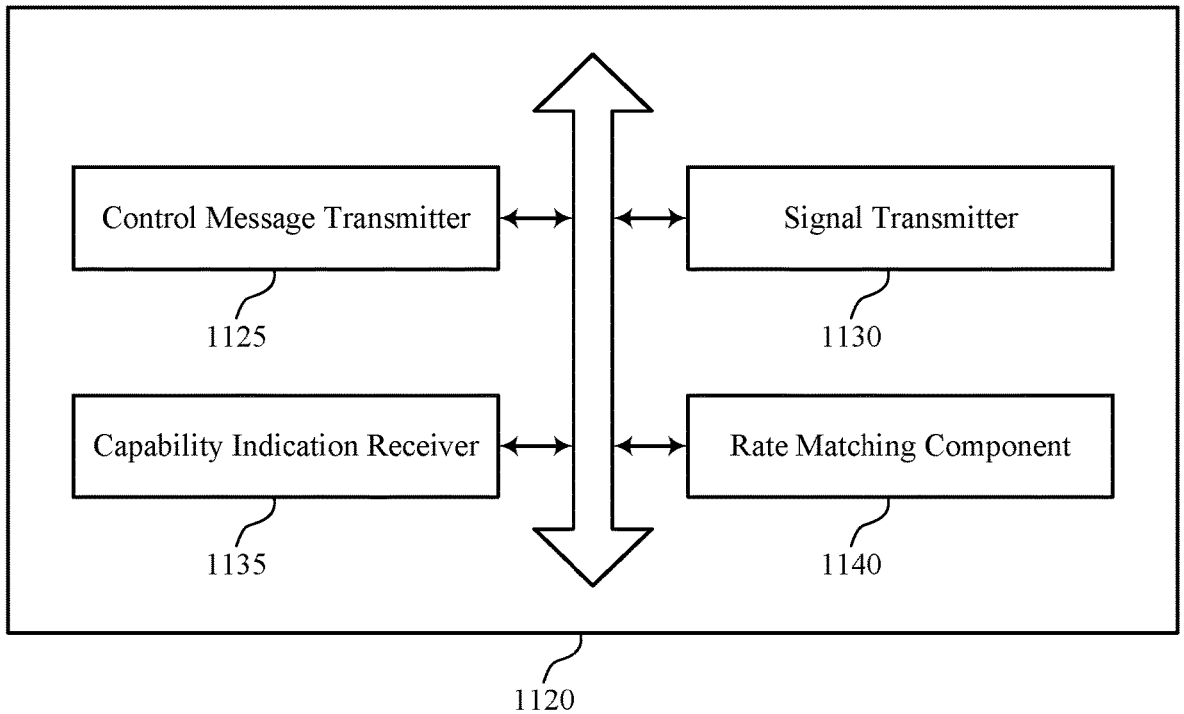
FIG. 11 shows a block diagram of a communications manager that supports notification of puncturing a PDSCH in accordance with aspects of the present disclosure.

FIG. 11 shows a block diagram 1100 of a communications manager 1120 that supports notification of puncturing a physical downlink shared channel in accordance with aspects of the present disclosure. The communications manager 1120 may be an example of aspects of a communications manager 920, a communications manager 1020, or both, as described herein. The communications manager 1120, or various components thereof, may be an example of means for performing various aspects of notification of puncturing a physical downlink shared channel as described herein. For example, the communications manager 1120 may include a control message transmitter 1125, a signal transmitter 1130, a capability indication receiver 1135, a rate matching component 1140, or any combination thereof. Each of these components may communicate, directly or indirectly, with one another (e.g., via one or more buses).

The communications manager 1120 may support wireless communication at a base station in accordance with examples as disclosed herein. The control message transmitter 1125 may be configured as or otherwise support a means for transmitting, to a first UE, a first control message identifying a set of resources used for transmissions by the base station. In some examples, the control message transmitter 1125 may be configured as or otherwise support a means for transmitting a second control message that includes an indication of a procedure used by the base station for a collision between the set of resources and a downlink channel transmitted to the first UE. The signal transmitter 1130 may be configured as or otherwise support a means for transmitting signals on the downlink channel according to the indicated procedure.

In some examples, to support transmitting the second control message, the control message transmitter 1125 may be configured as or otherwise support a means for transmitting, in the second control message, both the indication and scheduling information for signals on the downlink channel.

In some examples, to support transmitting the signals on the downlink channel according to the indication, the signal transmitter 1130 may be configured as or otherwise support a means for transmitting signals on at least a portion of the downlink channel that overlaps with at least a portion of the set of resources based on the indicated procedure being that the base station has spatially separated signals on the set of resources from signal of the downlink channel.

In some examples, to support transmitting the signals on the downlink channel according to the indication, the rate matching component 1140 may be configured as or otherwise support a means for performing rate matching around the set of resources to transmit the signals based on the indicated procedure being that the base station has rate matched the set of resources around signals of the downlink channel.

In some examples, the second control message is a second downlink control information message, and the control message transmitter 1125 may be configured as or otherwise support a means for transmitting a first downlink control information message that includes scheduling information for the signals on the downlink channel, where transmitting the signals on the downlink channel according to the indication includes. In some examples, the second control message is a second downlink control information message, and the signal transmitter 1130 may be configured as or otherwise support a means for transmitting the signals on the downlink channel according to the scheduling information, the second downlink control information message transmitting after transmitting the signals.

In some examples, the indicated procedure is that the base station has spatially separated signals on the set of resources from signals of the downlink channel.

In some examples, the indicated procedure is that the base station has punctured signals the downlink channel with signals on the set of resources.

In some examples, the capability indication receiver 1135 may be configured as or otherwise support a means for receiving, from the first UE, a capability indication identifying that the first UE is capable of receiving the indication of the procedure used by the base station for the collision between the set of resources and the downlink channel.

In some examples, the set of resources include resources for SSBs, CORESETs, channel state information reference signals, physical broadcast channel, system information blocks, control channels, or any combination thereof, used by the base station to transmit to the at least one second UE.

In some examples, the downlink channel is associated with a first transmit beam and a first cell, and the set of resources used by the base station to transmit to the at least one second UE is associated with a different transmit beam, a different cell, or both.

Figure 12:
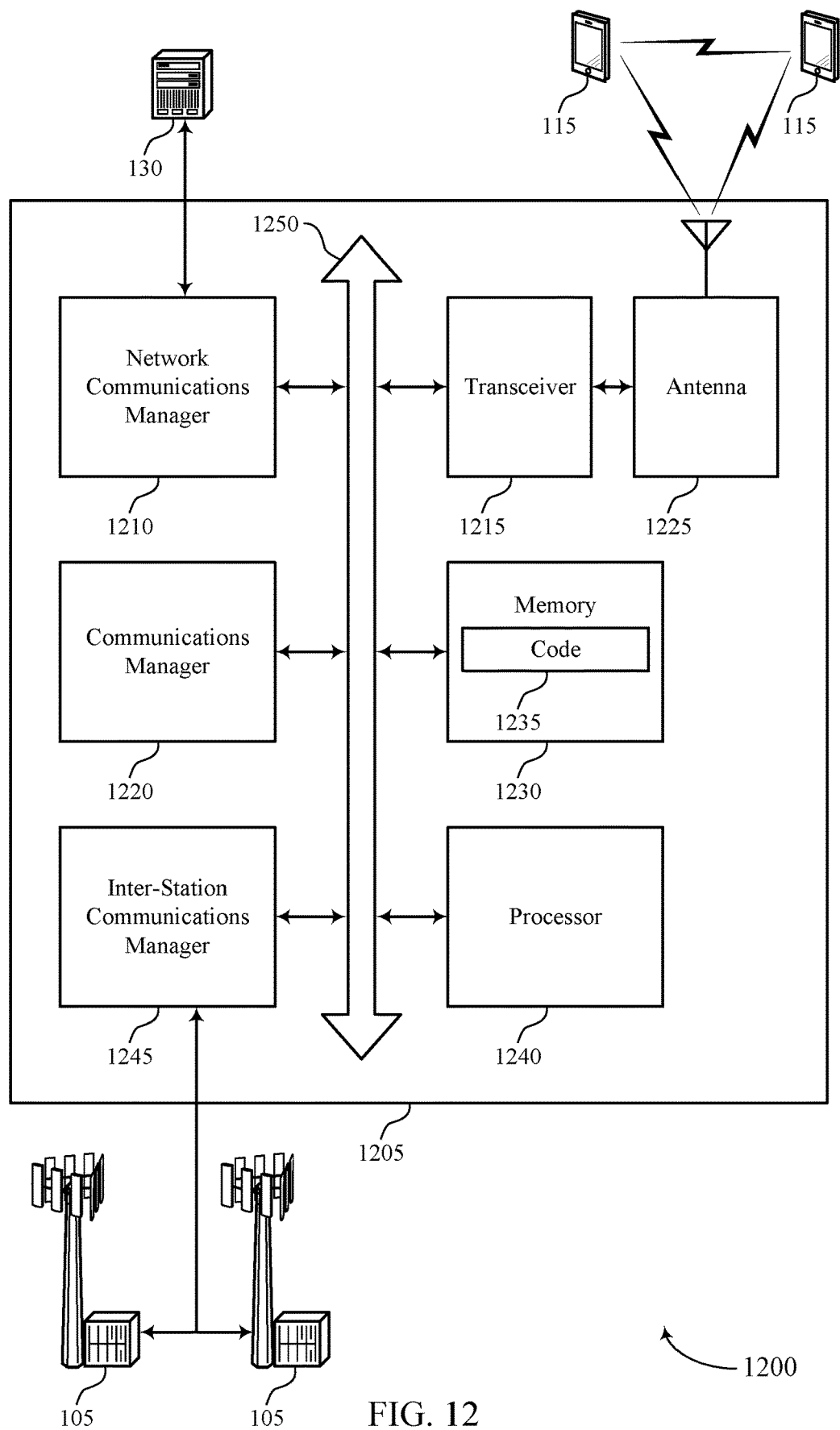
FIG. 12 shows a diagram of a system including a device that supports notification of puncturing a PDSCH in accordance with aspects of the present disclosure.

FIG. 12 shows a diagram of a system 1200 including a device 1205 that supports notification of puncturing a physical downlink shared channel in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting notification of puncturing a physical downlink shared channel). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a first UE, a first control message identifying a set of resources used for transmissions by the base station. The communications manager 1220 may be configured as or otherwise support a means for transmitting a second control message that includes an indication of a procedure used by the base station for a collision between the set of resources and a downlink channel transmitted to the first UE. The communications manager 1220 may be configured as or otherwise support a means for transmitting signals on the downlink channel according to the indicated procedure.

By including or configuring the communications manager 1220 in accordance with examples as described herein, the device 1205 may support techniques for transmitting a PDSCH puncturing notification, notifying a UE whether a received signal was rate matched, punctured, or spatially separated, resulting in improved communication reliability, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of notification of puncturing a physical downlink shared channel as described herein, or the processor 1240 and the memory 1230 may be otherwise configured to perform or support such operations.

Figure 13:
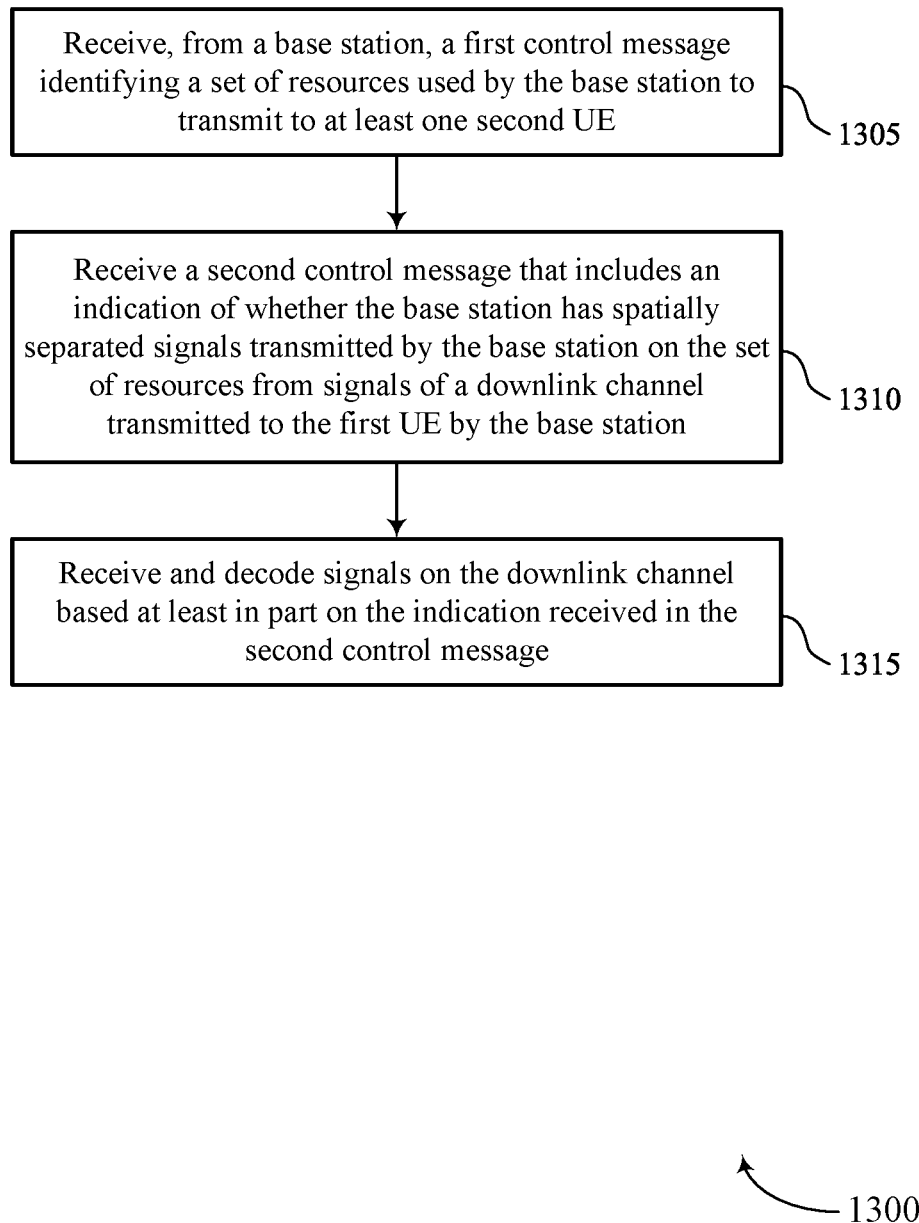
FIGS. 13 through 18 show flowcharts illustrating methods that support notification of puncturing a PDSCH in accordance with aspects of the present disclosure.

FIG. 13 shows a flowchart illustrating a method 1300 that supports notification of puncturing a physical downlink shared channel in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a first control message identifying a set of resources used for transmissions by the base station. The operations of 1305 may be performed in accordance with examples as disclosed herein. In some examples, aspects of the operations of 1305 may be performed by a control message receiver 725 as described with reference to FIG. 7.

At 1310, the method may include receiving a second control message that includes an indication of a procedure used by the base station for a collision between the set of resources and a downlink channel transmitted to the first UE by the base station. The operations of 1310 may be performed in accordance with examples as disclosed herein. In some examples, aspects of the operations of 1310 may be performed by a control message receiver 725 as described with reference to FIG. 7.

At 1315, the method may include receiving and decoding signals on the downlink channel according to the indicated procedure. The operations of 1315 may be performed in accordance with examples as disclosed herein. In some examples, aspects of the operations of 1315 may be performed by a signal receiver 730 as described with reference to FIG. 7.

Figure 14:
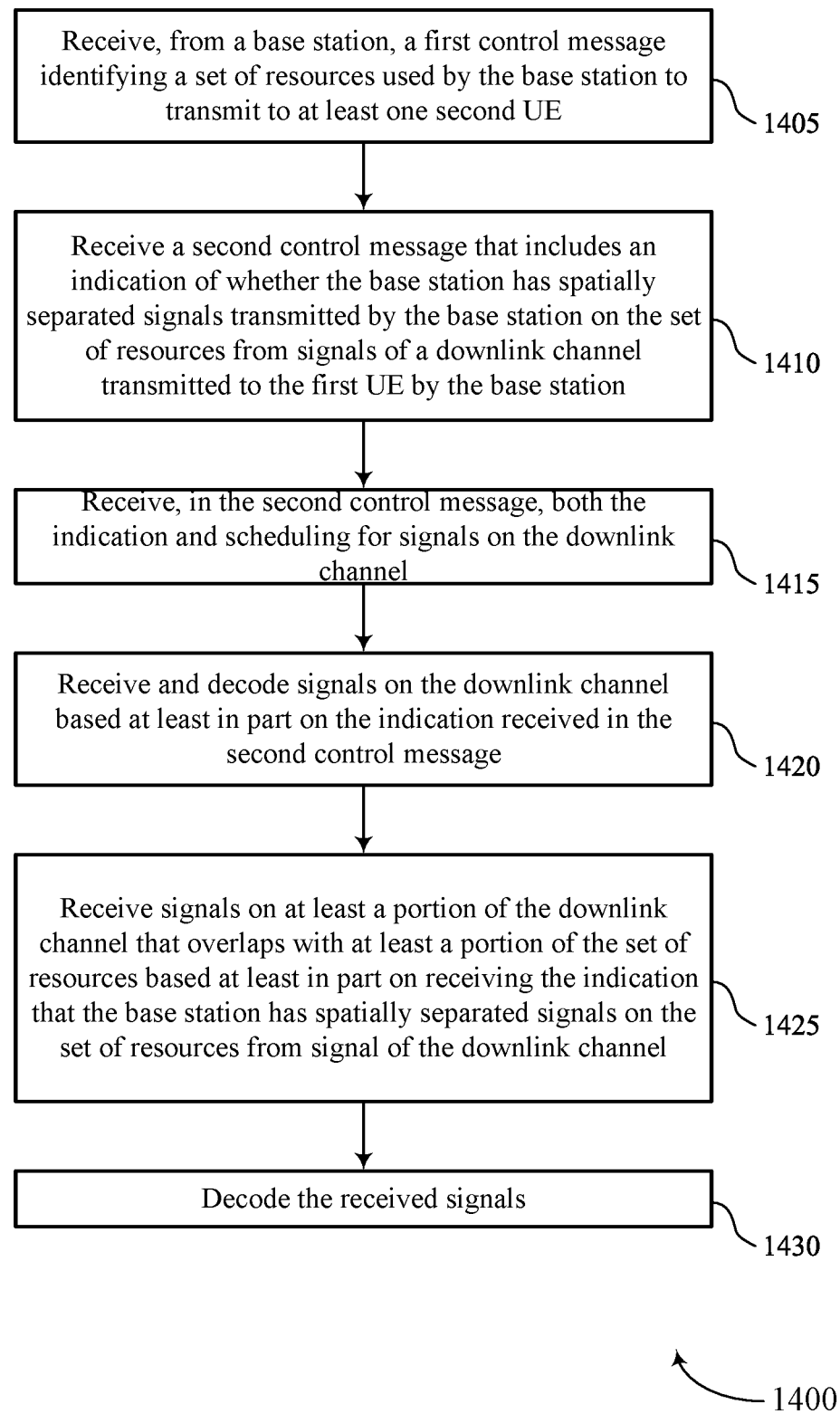

FIG. 14 shows a flowchart illustrating a method 1400 that supports notification of puncturing a physical downlink shared channel in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a first control message identifying a set of resources used for transmissions by the base station. The operations of 1405 may be performed in accordance with examples as disclosed herein. In some examples, aspects of the operations of 1405 may be performed by a control message receiver 725 as described with reference to FIG. 7.

At 1410, the method may include receiving a second control message that includes an indication of a procedure used by the base station for a collision between the set of resources and a downlink channel transmitted to the first UE by the base station. The operations of 1410 may be performed in accordance with examples as disclosed herein. In some examples, aspects of the operations of 1410 may be performed by a control message receiver 725 as described with reference to FIG. 7.

At 1415, the method may include receiving, in the second control message, both the indication and scheduling for signals on the downlink channel. The operations of 1415 may be performed in accordance with examples as disclosed herein. In some examples, aspects of the operations of 1415 may be performed by a control message receiver 725 as described with reference to FIG. 7.

At 1420, the method may include receiving and decoding signals on the downlink channel according to the indicated procedure. The operations of 1420 may be performed in accordance with examples as disclosed herein. In some examples, aspects of the operations of 1420 may be performed by a signal receiver 730 as described with reference to FIG. 7.

At 1425, the method may include receiving signals on at least a portion of the downlink channel that overlaps with at least a portion of the set of resources based on the indicated procedure being that the base station has spatially separated signals on the set of resources from signal of the downlink channel. The operations of 1425 may be performed in accordance with examples as disclosed herein. In some examples, aspects of the operations of 1425 may be performed by a signal receiver 730 as described with reference to FIG. 7.

At 1430, the method may include decoding the received signals. The operations of 1430 may be performed in accordance with examples as disclosed herein. In some examples, aspects of the operations of 1430 may be performed by a signal decoding component 735 as described with reference to FIG. 7.

Figure 15:
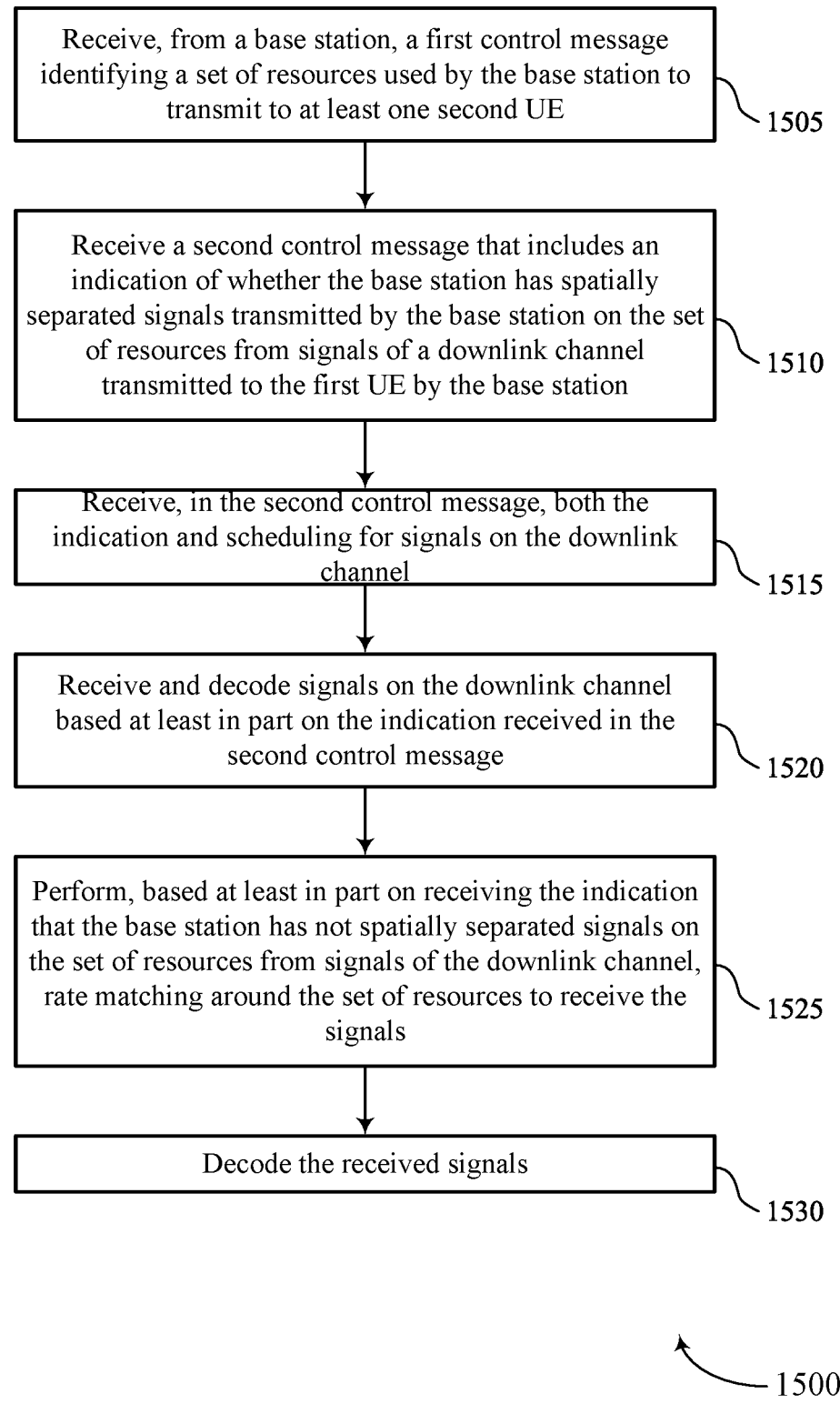

FIG. 15 shows a flowchart illustrating a method 1500 that supports notification of puncturing a physical downlink shared channel in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a first control message identifying a set of resources used for transmissions by the base station. The operations of 1505 may be performed in accordance with examples as disclosed herein. In some examples, aspects of the operations of 1505 may be performed by a control message receiver 725 as described with reference to FIG. 7.

At 1510, the method may include receiving a second control message that includes an indication of a procedure used by the base station for a collision between the set of resources and a downlink channel transmitted to the first UE by the base station. The operations of 1510 may be performed in accordance with examples as disclosed herein. In some examples, aspects of the operations of 1510 may be performed by a control message receiver 725 as described with reference to FIG. 7.

At 1515, the method may include receiving, in the second control message, both the indication and scheduling for signals on the downlink channel. The operations of 1515 may be performed in accordance with examples as disclosed herein. In some examples, aspects of the operations of 1515 may be performed by a control message receiver 725 as described with reference to FIG. 7.

At 1520, the method may include receiving and decoding signals on the downlink channel according to the indicated procedure. The operations of 1520 may be performed in accordance with examples as disclosed herein. In some examples, aspects of the operations of 1520 may be performed by a signal receiver 730 as described with reference to FIG. 7.

At 1525, the method may include performing rate matching around the set of resources to receive the signals based on the indicated procedure being that the base station has rate matched the set of resources around signals of the downlink channel. The operations of 1525 may be performed in accordance with examples as disclosed herein. In some examples, aspects of the operations of 1525 may be performed by a rate matching component 745 as described with reference to FIG. 7.

At 1530, the method may include decoding the received signals. The operations of 1530 may be performed in accordance with examples as disclosed herein. In some examples, aspects of the operations of 1530 may be performed by a signal decoding component 735 as described with reference to FIG. 7.

Figure 16:
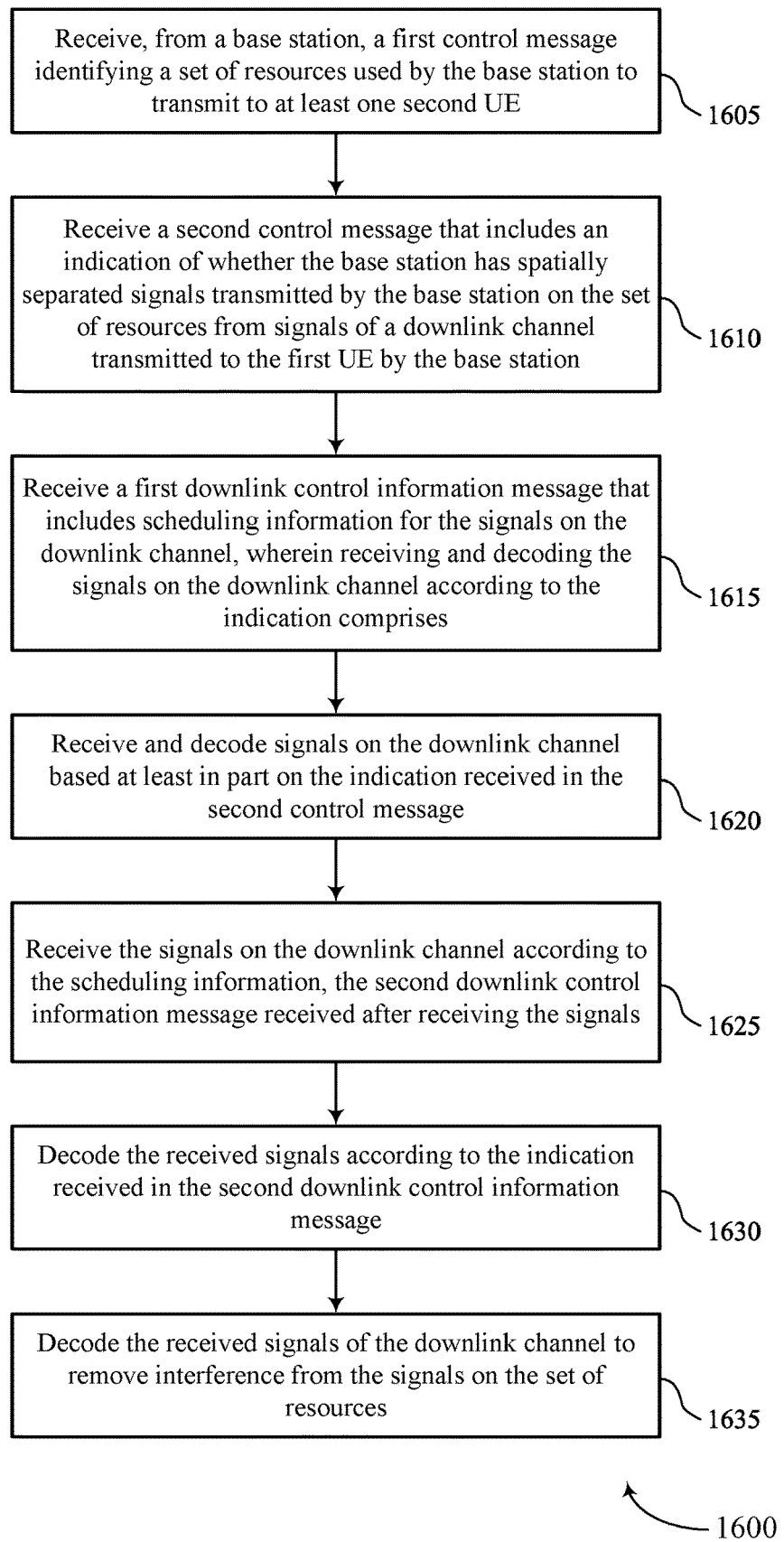

FIG. 16 shows a flowchart illustrating a method 1600 that supports notification of puncturing a physical downlink shared channel in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first control message identifying a set of resources used for transmissions by the base station. The operations of 1605 may be performed in accordance with examples as disclosed herein. In some examples, aspects of the operations of 1605 may be performed by a control message receiver 725 as described with reference to FIG. 7.

At 1610, the method may include receiving a second control message that includes an indication of a procedure used by the base station for a collision between the set of resources and a downlink channel transmitted to the first UE by the base station. The operations of 1610 may be performed in accordance with examples as disclosed herein. In some examples, aspects of the operations of 1610 may be performed by a control message receiver 725 as described with reference to FIG. 7.

At 1615, the method may include receiving a first downlink control information message that includes scheduling information for the signals on the downlink channel, where receiving and decoding the signals on the downlink channel according to the indication includes. The operations of 1615 may be performed in accordance with examples as disclosed herein. In some examples, aspects of the operations of 1615 may be performed by a control message receiver 725 as described with reference to FIG. 7.

At 1620, the method may include receiving and decoding signals on the downlink channel according to the indicated procedure. The operations of 1620 may be performed in accordance with examples as disclosed herein. In some examples, aspects of the operations of 1620 may be performed by a signal receiver 730 as described with reference to FIG. 7.

At 1625, the method may include receiving the signals on the downlink channel according to the scheduling information, the second downlink control information message received after receiving the signals. The operations of 1625 may be performed in accordance with examples as disclosed herein. In some examples, aspects of the operations of 1625 may be performed by a signal receiver 730 as described with reference to FIG. 7.

At 1630, the method may include decoding the received signals according to the indication received in the second downlink control information message. The operations of 1630 may be performed in accordance with examples as disclosed herein. In some examples, aspects of the operations of 1630 may be performed by a signal decoding component 735 as described with reference to FIG. 7.

At 1635, the method may include decoding the received signals of the downlink channel to remove interference from the signals on the set of resources. The operations of 1635 may be performed in accordance with examples as disclosed herein. In some examples, aspects of the operations of 1635 may be performed by a signal decoding component 735 as described with reference to FIG. 7.

Figure 17:
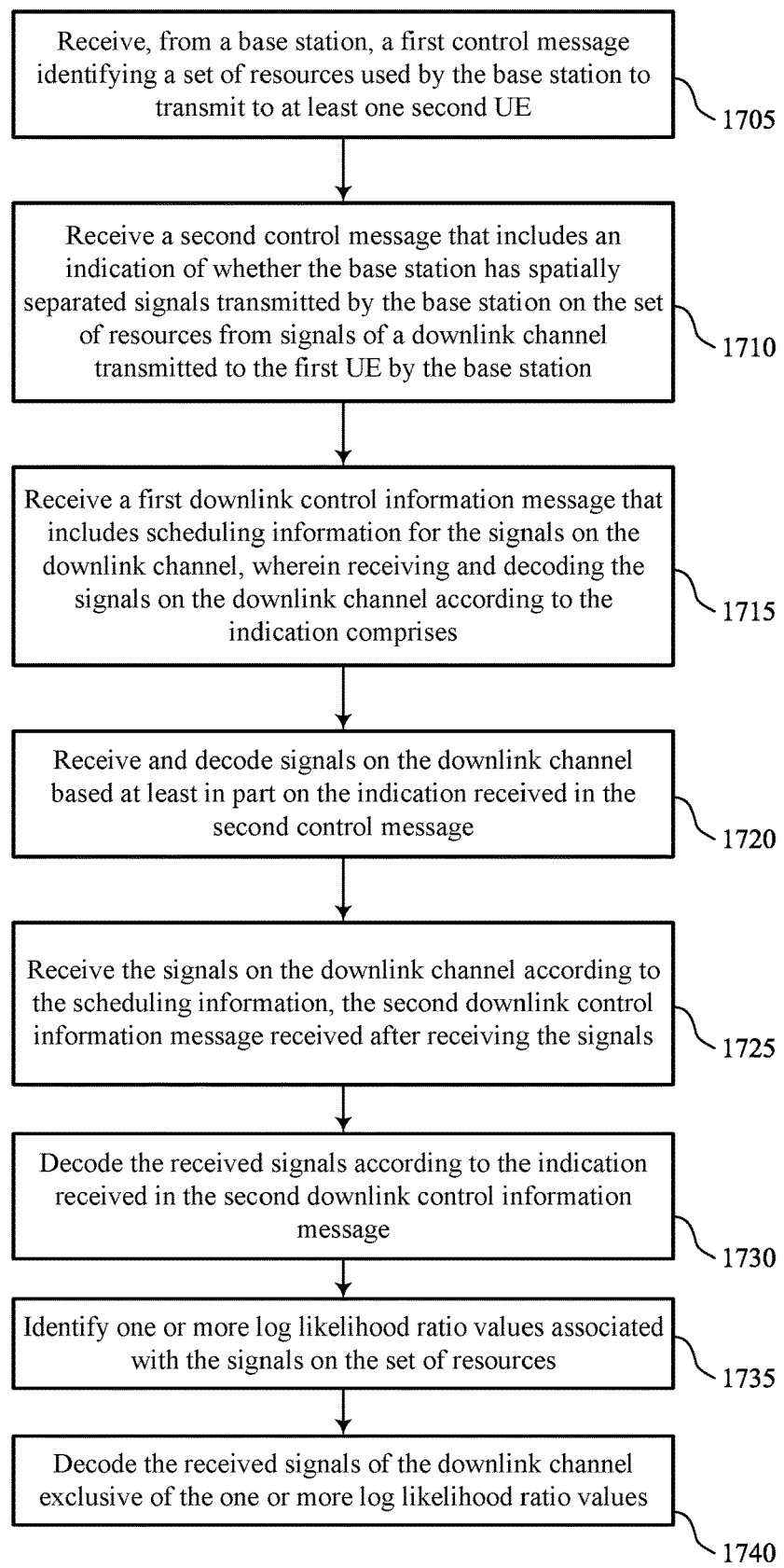

FIG. 17 shows a flowchart illustrating a method 1700 that supports notification of puncturing a physical downlink shared channel in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a first control message identifying a set of resources used for transmissions by the base station. The operations of 1705 may be performed in accordance with examples as disclosed herein. In some examples, aspects of the operations of 1705 may be performed by a control message receiver 725 as described with reference to FIG. 7.

At 1710, the method may include receiving a second control message that includes an indication of a procedure used by the base station for a collision between the set of resources and a downlink channel transmitted to the first UE by the base station. The operations of 1710 may be performed in accordance with examples as disclosed herein. In some examples, aspects of the operations of 1710 may be performed by a control message receiver 725 as described with reference to FIG. 7.

At 1715, the method may include receiving a first downlink control information message that includes scheduling information for the signals on the downlink channel, where receiving and decoding the signals on the downlink channel according to the indication includes. The operations of 1715 may be performed in accordance with examples as disclosed herein. In some examples, aspects of the operations of 1715 may be performed by a control message receiver 725 as described with reference to FIG. 7.

At 1720, the method may include receiving and decoding signals on the downlink channel according to the indicated procedure. The operations of 1720 may be performed in accordance with examples as disclosed herein. In some examples, aspects of the operations of 1720 may be performed by a signal receiver 730 as described with reference to FIG. 7.

At 1725, the method may include receiving the signals on the downlink channel according to the scheduling information, the second downlink control information message received after receiving the signals. The operations of 1725 may be performed in accordance with examples as disclosed herein. In some examples, aspects of the operations of 1725 may be performed by a signal receiver 730 as described with reference to FIG. 7.

At 1730, the method may include decoding the received signals according to the indication received in the second downlink control information message. The operations of 1730 may be performed in accordance with examples as disclosed herein. In some examples, aspects of the operations of 1730 may be performed by a signal decoding component 735 as described with reference to FIG. 7.

At 1735, the method may include identifying one or more LLR values associated with the signals on the set of resources. The operations of 1735 may be performed in accordance with examples as disclosed herein. In some examples, aspects of the operations of 1735 may be performed by an LLR identification component 750 as described with reference to FIG. 7.

At 1740, the method may include decoding the received signals of the downlink channel exclusive of the one or more LLR values. The operations of 1740 may be performed in accordance with examples as disclosed herein. In some examples, aspects of the operations of 1740 may be performed by a signal decoding component 735 as described with reference to FIG. 7.

Figure 18:
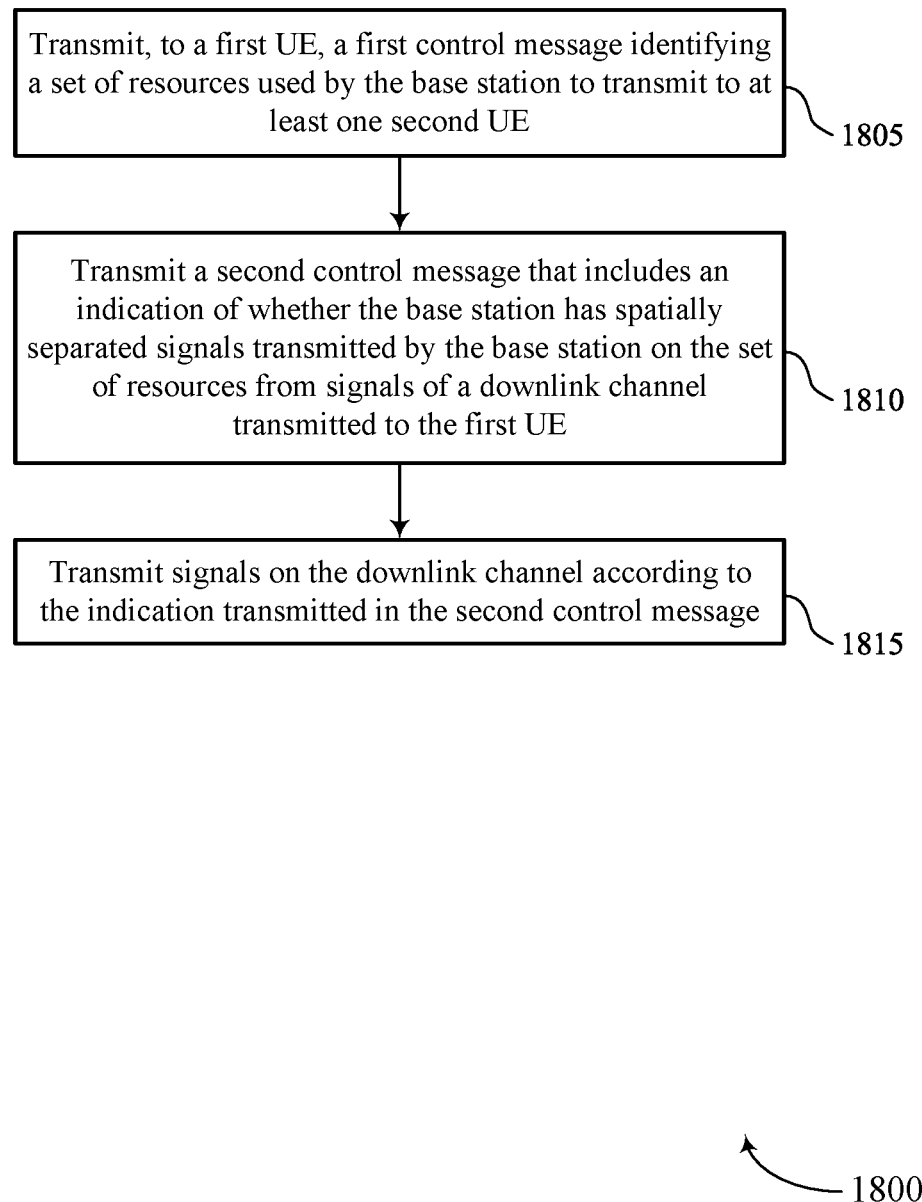

FIG. 18 shows a flowchart illustrating a method 1800 that supports notification of puncturing a physical downlink shared channel in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a first UE, a first control message identifying a set of resources used for transmissions by the base station. The operations of 1805 may be performed in accordance with examples as disclosed herein. In some examples, aspects of the operations of 1805 may be performed by a control message transmitter 1125 as described with reference to FIG. 11.

At 1810, the method may include transmitting a second control message that includes an indication of a procedure used by the base station for a collision between the set of resources and a downlink channel transmitted to the first UE. The operations of 1810 may be performed in accordance with examples as disclosed herein. In some examples, aspects of the operations of 1810 may be performed by a control message transmitter 1125 as described with reference to FIG. 11.

At 1815, the method may include transmitting signals on the downlink channel according to the indicated procedure. The operations of 1815 may be performed in accordance with examples as disclosed herein. In some examples, aspects of the operations of 1815 may be performed by a signal transmitter 1130 as described with reference to FIG. 11.

The following provides an overview of aspects of the present disclosure:

Aspect 1: A method for wireless communication at a first UE, comprising: receiving, from a base station, a first control message identifying a set of resources used for transmissions by the base station; receiving a second control message that includes an indication of a procedure used by the base station for a collision between the set of resources and a downlink channel transmitted to the first UE by the base station; and receiving and decoding signals on the downlink channel according to the indicated procedure.

Aspect 2: The method of aspect 1, wherein receiving the second control message comprises: receiving, in the second control message, both the indication and scheduling for signals on the downlink channel.

Aspect 3: The method of aspect 2, wherein receiving and decoding the signals on the downlink channel according to the indication comprises: receiving signals on at least a portion of the downlink channel that overlaps with at least a portion of the set of resources based at least in part on the indicated procedure being that the base station has spatially separated signals on the set of resources from signal of the downlink channel; and decoding the received signals.

Aspect 4: The method of any of aspects 2 through 3, wherein receiving and decoding the signals on the downlink channel according to the indication comprises: performing rate matching around the set of resources to receive the signals based at least in part on the indicated procedure being that the base station has rate matched the set of resources around signals of the downlink channel; and decoding the received signals.

Aspect 5: The method of any of aspects 1 through 4, wherein the second control message is a second downlink control information message, the method further comprising: receiving a first downlink control information message that includes scheduling information for the signals on the downlink channel, wherein receiving and decoding the signals on the downlink channel according to the indication comprises: receiving the signals on the downlink channel according to the scheduling information, the second downlink control information message received after receiving the signals; and decoding the received signals according to the indication received in the second downlink control information message.

Aspect 6: The method of aspect 5, wherein the indicated procedure being that the base station has spatially separated signals on the set of resources from signals of the downlink channel, and decoding the received signals comprises: decoding the received signals of the downlink channel to remove interference from the signals on the set of resources.

Aspect 7: The method of any of aspects 5 through 6, wherein the indicated procedure is that the base station has punctured signals the downlink channel with signals on the set of resources, and decoding the received signals comprises: identifying one or more log likelihood ratio values associated with the signals on the set of resources; and decoding the received signals of the downlink channel exclusive of the one or more log likelihood ratio values.

Aspect 8: The method of any of aspects 1 through 7, further comprising: transmitting, to the base station, a capability indication identifying that the first UE is capable of receiving the indication of the procedure used by the base station for the collision between the set of resources and the downlink channel.

Aspect 9: The method of any of aspects 1 through 8, wherein the set of resources comprise resources for synchronization signal blocks, control resource sets, channel state information reference signals, physical broadcast channel, system information blocks, control channels, or any combination thereof, used by the base station to transmit to at least one second UE.

Aspect 10: The method of any of aspects 1 through 9, wherein the downlink channel is associated with a first transmit beam and a first cell, and the set of resources used by the base station to transmit to at least one second UE is associated with a different transmit beam, a different cell, or both.

Aspect 11: A method for wireless communication at a base station, comprising: transmitting, to a first UE, a first control message identifying a set of resources used for transmissions by the base station; transmitting a second control message that includes an indication of a procedure used by the base station for a collision between the set of resources and a downlink channel transmitted to the first UE; and transmitting signals on the downlink channel according to the indicated procedure.

Aspect 12: The method of aspect 11, wherein transmitting the second control message comprises: transmitting, in the second control message, both the indication and scheduling information for signals on the downlink channel.

Aspect 13: The method of aspect 12, wherein transmitting the signals on the downlink channel according to the indication comprises: transmitting signals on at least a portion of the downlink channel that overlaps with at least a portion of the set of resources based at least in part on the indicated procedure being that the base station has spatially separated signals on the set of resources from signal of the downlink channel.

Aspect 14: The method of any of aspects 12 through 13, wherein transmitting the signals on the downlink channel according to the indication comprises: performing rate matching around the set of resources to transmit the signals based at least in part on the indicated procedure being that the base station has rate matched the set of resources around signals of the downlink channel.

Aspect 15: The method of any of aspects 11 through 14, wherein the second control message is a second downlink control information message, the method further comprising: transmitting a first downlink control information message that includes scheduling information for the signals on the downlink channel, wherein transmitting the signals on the downlink channel according to the indication comprises: transmitting the signals on the downlink channel according to the scheduling information, the second downlink control information message transmitting after transmitting the signals.

Aspect 16: The method of aspect 15, wherein the indicated procedure is that the base station has spatially separated signals on the set of resources from signals of the downlink channel.

Aspect 17: The method of any of aspects 15 through 16, wherein the indicated procedure is that the base station has punctured signals the downlink channel with signals on the set of resources.

Aspect 18: The method of any of aspects 11 through 17, further comprising: receiving, from the first UE, a capability indication identifying that the first UE is capable of receiving the indication of the procedure used by the base station for the collision between the set of resources and the downlink channel.

Aspect 19: The method of any of aspects 11 through 18, wherein the set of resources comprise resources for synchronization signal blocks, control resource sets, channel state information reference signals, physical broadcast channel, system information blocks, control channels, or any combination thereof, used by the base station to transmit to at least one second UE.

Aspect 20: The method of any of aspects 11 through 19, wherein the downlink channel is associated with a first transmit beam and a first cell, and the set of resources used by the base station to transmit to at least one second UE is associated with a different transmit beam, a different cell, or both.

Aspect 21: An apparatus for wireless communication at a first UE, comprising a processor; memory coupled with the processor; and instructions stored in the memory and executable by the processor to cause the apparatus to perform a method of any of aspects 1 through 10.

Aspect 22: An apparatus for wireless communication at a first UE, comprising at least one means for performing a method of any of aspects 1 through 10.

Aspect 23: A non-transitory computer-readable medium storing code for wireless communication at a first UE, the code comprising instructions executable by a processor to perform a method of any of aspects 1 through 10.

Aspect 24: An apparatus for wireless communication at a base station, comprising a processor; memory coupled with the processor; and instructions stored in the memory and executable by the processor to cause the apparatus to perform a method of any of aspects 11 through 20.

Aspect 25: An apparatus for wireless communication at a base station, comprising at least one means for performing a method of any of aspects 11 through 20.

Aspect 26: A non-transitory computer-readable medium storing code for wireless communication at a base station, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
receiving, from a base station, a first control message identifying a set of resources used for transmissions by the base station;
receiving a second control message that includes an indication of a procedure used by the base station for a collision between the set of resources and a downlink channel transmitted to the first UE by the base station, the second control message includes scheduling for signals on the downlink channel;
receiving signals on at least a portion of the downlink channel that overlaps with at least a portion of the set of resources based at least in part on the indicated procedure being that the base station has spatially separated signals on the set of resources from signals of the downlink channel; and
decoding the received signals.

2. The method of claim 1, further comprising:
transmitting, to the base station, a capability indication identifying that the first UE is capable of receiving the indication of the procedure used by the base station for the collision between the set of resources and the downlink channel.

3. The method of claim 1, wherein the set of resources comprise resources for synchronization signal blocks, control resource sets, channel state information reference signals, physical broadcast channel, system information blocks, control channels, or any combination thereof, used by the base station to transmit to at least one second UE.

4. The method of claim 1, wherein receiving and decoding the signals on the downlink channel according to the indication comprises:
performing rate matching around the set of resources to receive the signals based at least in part on the indicated procedure being that the base station has rate matched the set of resources around signals of the downlink channel; and
decoding the received signals.

5. The method of claim 1, wherein the second control message is a second downlink control information message, the method further comprising:
receiving a first downlink control information message that includes scheduling information for the signals on the downlink channel, wherein receiving and decoding the signals on the downlink channel according to the indication comprises:
receiving the signals on the downlink channel according to the scheduling information, the second downlink control information message received after receiving the signals; and
decoding the received signals according to the indication received in the second downlink control information message.

6. The method of claim 5, wherein the indicated procedure being that the base station has spatially separated signals on the set of resources from signals of the downlink channel, and decoding the received signals comprises:
decoding the received signals of the downlink channel to remove interference from the signals on the set of resources.

7. The method of claim 5, wherein the indicated procedure is that the base station has punctured signals the downlink channel with signals on the set of resources, and decoding the received signals comprises:
identifying one or more log likelihood ratio values associated with the signals on the set of resources; and
decoding the received signals of the downlink channel exclusive of the one or more log likelihood ratio values.

8. The method of claim 1, wherein the downlink channel is associated with a first transmit beam and a first cell, and the set of resources used by the base station to transmit to at least one second UE is associated with a different transmit beam, a different cell, or both.

9. An apparatus for wireless communication at a base station, comprising:
a processor;
memory coupled with the processor; and
instructions stored in the memory and executable by the processor to cause the apparatus to:
transmit, to a first user equipment (UE), a first control message identifying a set of resources used for transmissions by the base station the first control message includes scheduling information for the signals on the downlink channel;
transmit a second control message that includes an indication of a procedure used by the base station for a collision between the set of resources and a downlink channel transmitted to the first UE; and
transmit signals on the downlink channel according to the indicated procedure comprising transmit the signals on the downlink channel according to the scheduling information, the second control message transmitting after transmitting the signals.

10. A method for wireless communication at a base station, comprising:
transmitting, to a first user equipment (UE), a first control message identifying a set of resources used for transmissions by the base station;
transmitting a second control message that includes an indication of a procedure used by the base station for a collision between the set of resources and a downlink channel transmitted to the first UE, the second control message includes scheduling for signals on the downlink channel; and
transmitting signals on at least a portion of the downlink channel that overlaps with at least a portion of the set of resources based at least in part on the indicated procedure being that the base station has spatially separated signals on the set of resources from signal of the downlink channel.

11. The method of claim 10, further comprising:
receiving, from the first UE, a capability indication identifying that the first UE is capable of receiving the indication of the procedure used by the base station for the collision between the set of resources and the downlink channel.

12. The method of claim 10, wherein the set of resources comprise resources for synchronization signal blocks, control resource sets, channel state information reference signals, physical broadcast channel, system information blocks, control channels, or any combination thereof, used by the base station to transmit to at least one second UE.

13. The method of claim 10, wherein the downlink channel is associated with a first transmit beam and a first cell, and the set of resources used by the base station to transmit to at least one second UE is associated with a different transmit beam, a different cell, or both.

14. The method of claim 10, wherein transmitting the signals on the downlink channel according to the indication comprises:
performing rate matching around the set of resources to transmit the signals based at least in part on the indicated procedure being that the base station has rate matched the set of resources around signals of the downlink channel.

15. The method of claim 10, wherein the second control message is a second downlink control information message, the method further comprising:
transmitting a first downlink control information message that includes scheduling information for the signals on the downlink channel, wherein transmitting the signals on the downlink channel according to the indication comprises:
transmitting the signals on the downlink channel according to the scheduling information, the second downlink control information message transmitting after transmitting the signals.

16. The method of claim 15, wherein the indicated procedure is that the base station has spatially separated signals on the set of resources from signals of the downlink channel.

17. The method of claim 15, wherein the indicated procedure is that the base station has punctured signals the downlink channel with signals on the set of resources.

18. An apparatus for wireless communication at a first user equipment (UE), comprising:
a processor;
memory coupled with the processor; and instructions stored in the memory and executable by the processor to cause the apparatus to:
  receive, from a base station, a first control message identifying a set of resources used for transmissions by the base station;
  receive a second control message that includes an indication of a procedure used by the base station for a collision between the set of resources and a downlink channel transmitted to the first UE by the base station, the second control message includes scheduling for signals on the downlink channel; and
  receive receive signals on at least a portion of the downlink channel that overlaps with at least a portion of the set of resources based at least in part on the indicated procedure being that the base station has spatially separated signals on the set of resources from signals of the downlink channel; and
  decode the received signals.

19. The apparatus of claim 18, wherein the instructions to receive and decode the signals on the downlink channel according to the indication are executable by the processor to cause the apparatus to:
  perform rate matching around the set of resources to receive the signals based at least in part on the indicated procedure being that the base station has rate matched the set of resources around signals of the downlink channel; and
  decode the received signals.

20. The apparatus of claim 18, wherein the second control message is a second downlink control information message, and the instructions are further executable by the processor to cause the apparatus to:
  receive a first downlink control information message that includes scheduling information for the signals on the downlink channel, wherein receiving and decoding the signals on the downlink channel according to the indication comprises:
  receive the signals on the downlink channel according to the scheduling information, the second downlink control information message received after receiving the signals; and
  decode the received signals according to the indication received in the second downlink control information message.

21. The apparatus of claim 20, wherein the indicated procedure is that the base station has spatially separated signals on the set of resources from signals of the downlink channel, and the instructions to decode the received signals are executable by the processor to cause the apparatus to:
  decode the received signals of the downlink channel to remove interference from the signals on the set of resources.

22. The apparatus of claim 20, wherein the indicated procedure is that the base station has punctured signals the downlink channel with signals on the set of resources, and the instructions to decode the received signals are executable by the processor to cause the apparatus to:
  identify one or more log likelihood ratio values associated with the signals on the set of resources; and
  decode the received signals of the downlink channel exclusive of the one or more log likelihood ratio values.

* * * * *